United States Patent [19]
Tairaku et al.

[11] Patent Number: 5,339,436
[45] Date of Patent: Aug. 16, 1994

[54] METHOD OF IMPLEMENTING A RELOCATED COMPILED LIBRARY PROGRAM WITH AN INTERPRETER TO CONTROL A MANUFACTURING LINE

[75] Inventors: Hirokazu Tairaku; Kenichi Inoue; Chiaki Ito; Kenji Takimoto; Shigetoshi Tanido, all of Tokyo, Japan

[73] Assignee: Yokogawa Electric Corporation, Tokyo, Japan

[21] Appl. No.: 7,010

[22] Filed: Jan. 21, 1993

Related U.S. Application Data

[60] Continuation of Ser. No. 865,886, Apr. 9, 1992, abandoned, which is a division of Ser. No. 572,899, Aug. 24, 1990, Pat. No. 5,175,864.

[30] Foreign Application Priority Data

| | | | |
|---|---|---|---|
| Aug. 31, 1989 | [JP] | Japan | 1-224939 |
| Aug. 31, 1989 | [JP] | Japan | 1-224940 |
| Jan. 29, 1990 | [JP] | Japan | 2-6149[U] |
| Mar. 5, 1990 | [JP] | Japan | 2-52990 |
| Apr. 10, 1990 | [JP] | Japan | 2-94339 |
| May 9, 1990 | [JP] | Japan | 2-47643[U] |

[51] Int. Cl.5 .............................. G06F 9/45
[52] U.S. Cl. ...................... 395/700; 395/600; 395/725; 364/280; 364/280.4
[58] Field of Search ........... 395/700, 600, 725, 425

[56] References Cited

U.S. PATENT DOCUMENTS

| | | | |
|---|---|---|---|
| 4,635,189 | 1/1987 | Kendall | 395/600 |
| 4,736,321 | 4/1988 | Brown et al. | 364/300 |
| 4,797,811 | 1/1989 | Kiyokawa et al. | 364/474.23 |
| 4,870,590 | 9/1989 | Kawata et al. | 364/468 |
| 4,949,255 | 8/1990 | Gerth et al. | 395/725 |
| 5,142,681 | 8/1992 | Driscoll et al. | 395/700 |
| 5,210,876 | 5/1993 | Uchida | 395/700 |

OTHER PUBLICATIONS

Brown, P. J., *Writing Interactive Compilers and Interpreters*, pp. 251–256 (1979).
Hunter, R., *The Design and Construction of Compilers*, pp. 1–2 (1981).
Calingaert, P., *Assemblers, Compilers, and Program Translation*, pp. 100–107, 182–189, 210–222, and 233–254 (1979).

*Primary Examiner*—Thomas C. Lee
*Assistant Examiner*—Paul Harrity
*Attorney, Agent, or Firm*—Moonray Kojima

[57] ABSTRACT

Another object is to enable different types of control instructions to coexist, wherein an address converter table is used to rapidly shift addresses in a memory without adversely affecting other operations. A method of controlling a manufacturing line using a central processing unit, wherein the various addresses in a memory are rapidly shifted using an address converter table so that different types of control instructions, such as compiler and interpreter languages, can coexist without any adverse affects. The method enables utilization of a high speed CPU and low speed I/O devices.

1 Claim, 19 Drawing Sheets

METHOD OF IMPLEMENTING A RELOCATED COMPILED LIBRARY PROGRAM WITH AN INTERPRETER TO CONTROL A MANUFACTURING LINE

This is a continuation of application Ser. No. 865,886, filed Apr. 9, 1992, now abandoned; which is a division of application Ser. No. 572,899, filed Aug. 24, 1990, now U.S. Pat. No. 5,175,864.

BACKGROUND OF THE INVENTION

1. Field of Invention

This invention relates to a line computer, such as one used for controlling a manufacturing line control system; and more particularly, to an improvement in a function of a central processing unit installed in the line computer.

2. Description of the Prior Art

A manufacturing line control system which uses line computers is disclosed in applicant's U.S. Pat. No. 4,870,590. The line computer described in the patent is described herein as prior art.

First, the configuration of peripheral circuits around a CPU (central processing unit) board of the line computer is described with reference to FIG. 1, which shows the main parts of the conventional line computer system, wherein a high speed CPU, such as 68020 or 68030 which operates at 25 MHz clock or 33 MHz clock, is used, together with input/output (I/O) devices which operate at low speeds.

In FIG. 1, CPU 1 is connected to a main memory block 2 and low speed I/O devices 31,32 through data bus DB, address bus AB and other signal lines. Address signal ADR, read/write signal R/$\overline{\text{W}}$, address strobe signal $\overline{\text{AS}}$, and data strobe signal $\overline{\text{DS}}$ are inputted to a decoder 4 from CPU 1. From decoder 4, chip select signals $\overline{\text{CS1}}$ and $\overline{\text{CS2}}$ are outputted to I/O devices 31, 32. Further, data strobe acknowledge signals DSACK, DSACK1, and DSACK2 are transmitted to a single signal line from respective blocks 1, 2, 31, 32 every time these blocks transmit or receive the data.

FIG. 2 is a time chart showing in a plurality of lines the operation of the foregoing system. Assuming that CPU 1 has started a read cycle for I/O device 31, address ADR, address strobe signal $\overline{\text{AS}}$(L), and data strobe signal $\overline{\text{DS}}$(L) are transmitted from CPU 1. Decoder 4 interprets these signals and then sends chip select signal $\overline{\text{CS1}}$(L) to I/O device 31. In response, I/O device 31 transmits read data (i.e., data read from I/O devices) corresponding to address ADR, to data bus DB. CPU 1 introduces this read data in accordance with information contained in the data strobe acknowledge signal $\overline{\text{DSACK1}}$(L). The read cycle ends with this operation.

Next, assuming that CPU 1 has started a write cycle for I/O device 32, address strobe signal $\overline{\text{AS}}$(L) is transmitted from CPU 1. A bit later, data strobe signal $\overline{\text{DS}}$(L) is transmitted. Decoder 4 interprets and then sends chip select signal $\overline{\text{CS2}}$(L) to I/O device 32.

CPU 1 transmits write data to data bus DB. After introducing this write data, I/O device 32 functions to change data strobe acknowledge signal $\overline{\text{DSACK2}}$ to an "L" state. The write cycle ends with this operation.

The FIG. 1 system repeats the read and write cycles.

The conventional system has various problems, among which are the following.

1. The address strobe signal $\overline{\text{AS}}$(L) is asserted immediately after the cycle starts, and is negated immediately before the cycle ends. Thus, both set time t1 and hold time t2 of the address ADR are too short for the low speed I/O devices to operate reliably. Accordingly, the processing time for the low speed I/O devices is insufficient.

2. The last data strobe acknowledge signal $\overline{\text{DSACK1}}$ does not change high impedance of the bus and the next data strobe acknowledge signal $\overline{\text{DSACK2}}$ becomes an active (L). Accordingly, during time period t3 (see FIG. 2), an overlap of signals occurs on the same line.

3. Occasionally, the write cycle is executed immediately after the read cycle. In this case, if the write data were sent to data bus DB from CPU 1 when the last time read data exists in the same data bus, an overlap would occur between these two data during time period t4 (see FIG. 2).

4. Since data strobe signal $\overline{\text{DS}}$(L) is cancelled immediately before the end of the write cycle, hold time t5 for the write data is insufficient for the low speed I/O device.

Accordingly, conventional systems leave room for improvement.

SUMMARY OF THE INVENTION

An object of the invention is to overcome the aforementioned and other drawbacks and deficiencies of the prior art.

Another object is to enable different types of control instructions to coexist, wherein an address converter table is used to rapidly shift addresses in memory without adversely affecting other operations.

The foregoing and other objects are attained in the invention which encompasses a method of controlling a manufacturing line using a processing unit comprising an interpreter means and a memory comprising a static variable area for storage of static variable data related to the manufacturing line, and a library area for storage of a plurality of addresses related to the manufacturing line and including a top address and a position dependent code address wherein the code stored at the position dependent code address includes a branch destination address, wherein the method comprises the steps of storing the static variable data in the static variable area of the memory; stacking various arguments related to the manufacturing line in the interpreter means; assigning the previously stored static variable data as an initial value each time the interpreter means is operated; setting in an address converter table relative address between the top address and the position dependent code address of the library area of the memory; setting in the address converter table relative address between the top address and the branch destination address of the library area of the memory; rewriting the branch destination address of the library area of the memory using the address converter table when the interpreter means is operated; and changing the top address of the library area of the memory using the address converter table.

DETAILED DESCRIPTION OF PREFERRED EMBODIMENTS

LINE COMPUTER SYSTEM

Figure 1:
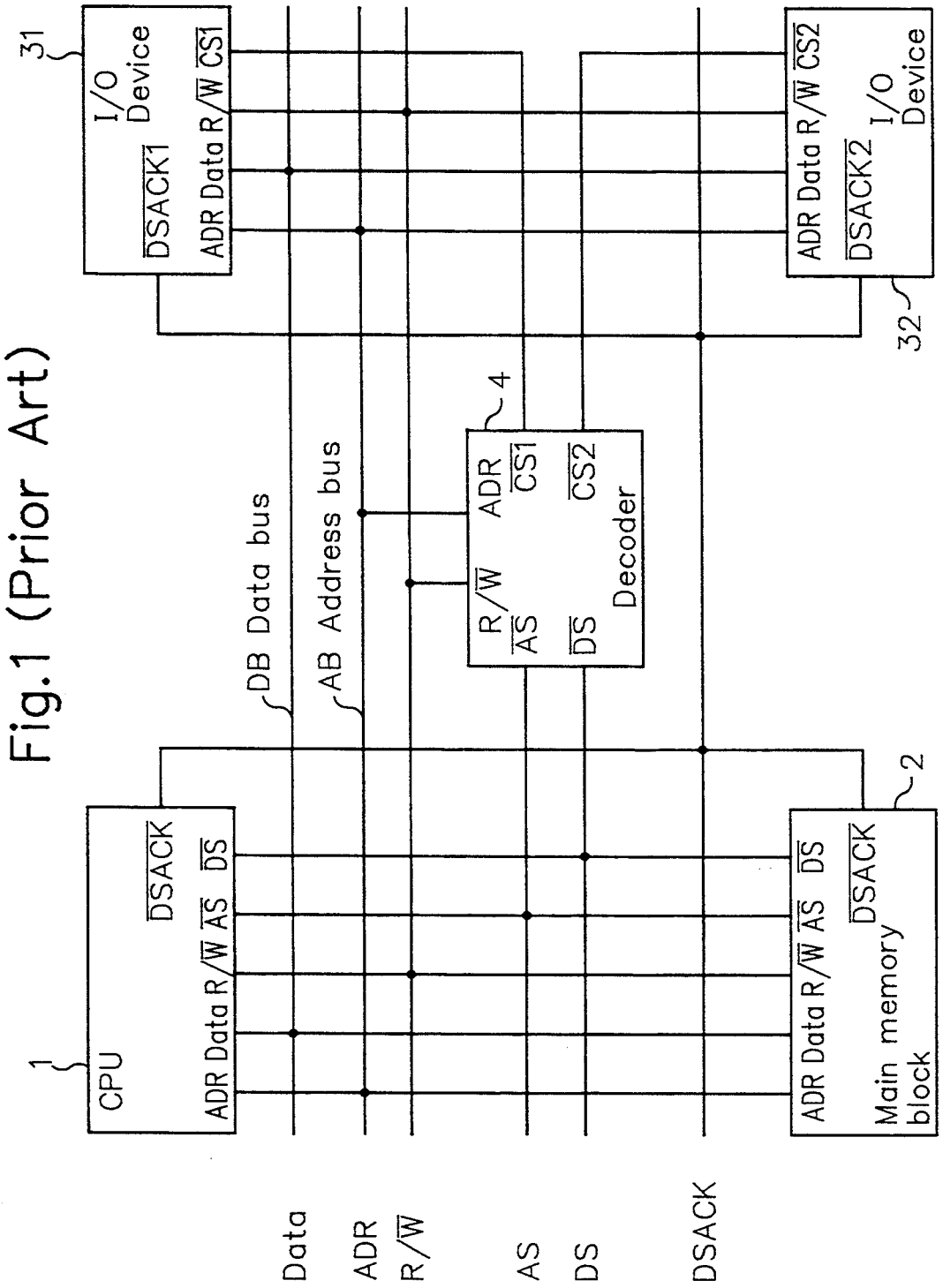
FIG. 1 is a block diagram depicting the main parts of a prior art line computer.
Figure 2:
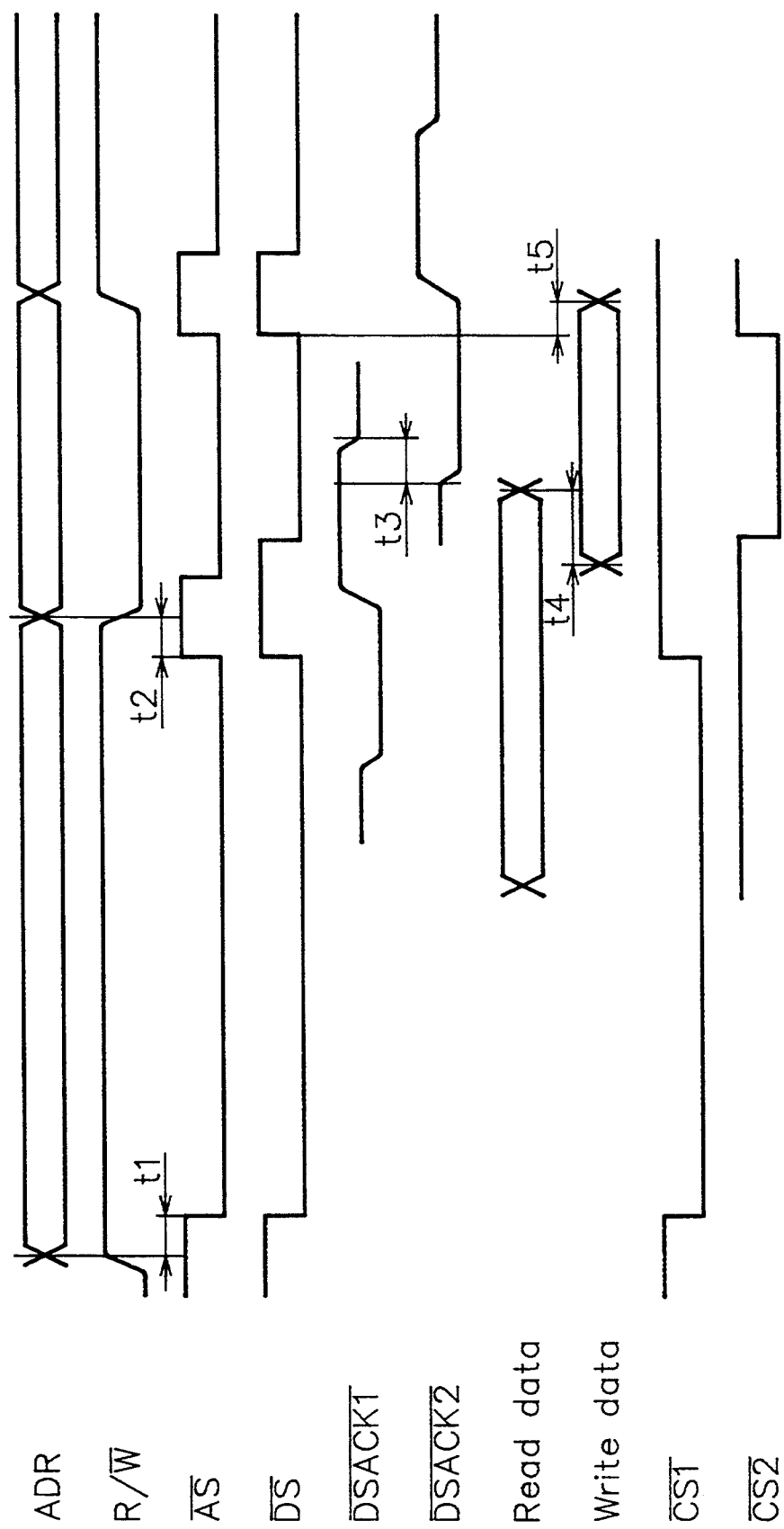
FIG. 2 is a time chart depicting the function of the computer of FIG. 1.
Figure 3:
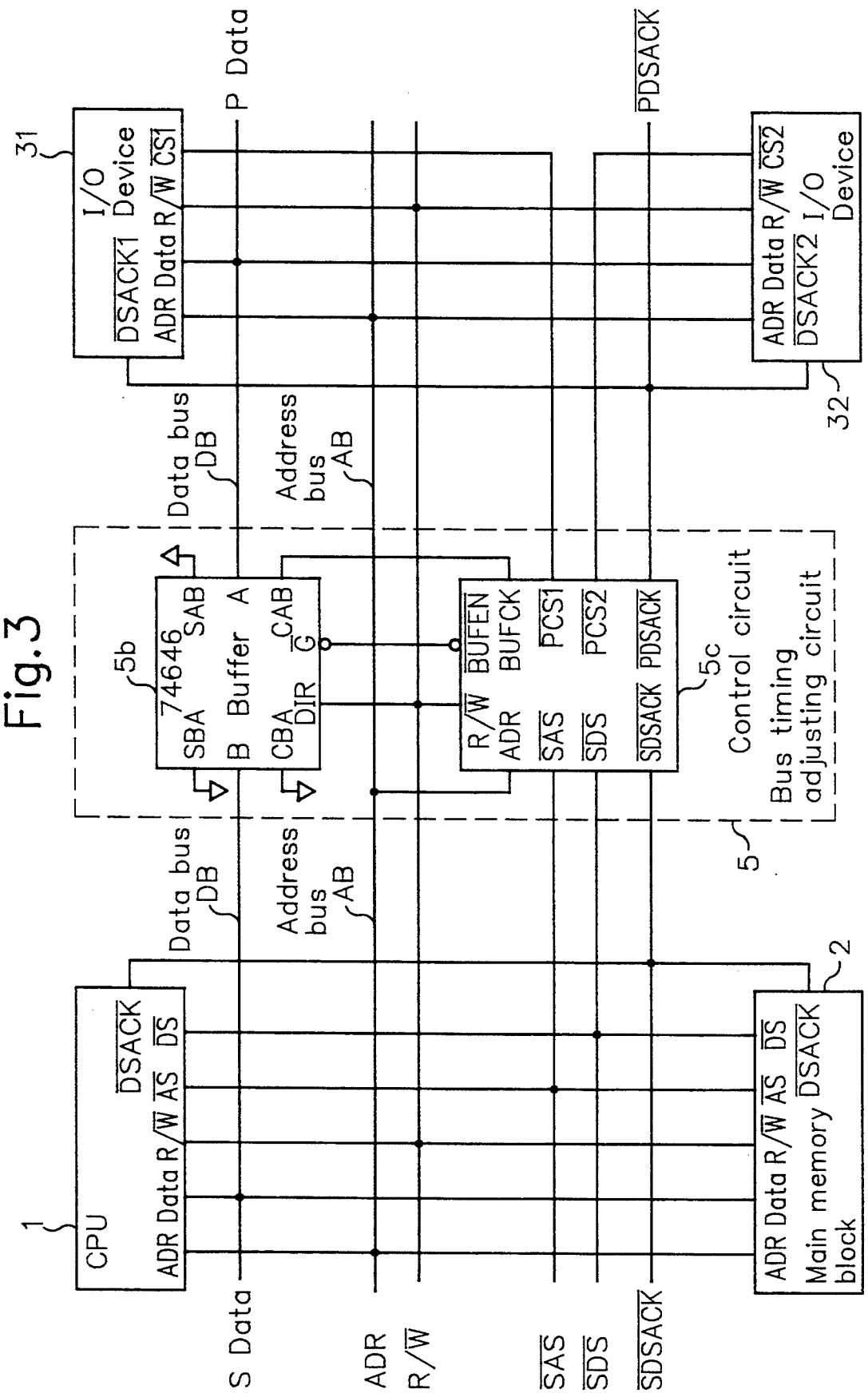
FIG. 3 is a block diagram depicting an illustrative embodiment of the invention.

Turning to FIG. 3, a bus timing adjusting circuit 5 is depicted wherein a bus timing adjusting circuit 5 is used in place of a decoder installed in a conventional apparatus. The bus timing adjusting circuit comprises buffer 5b and control circuit 5c are provided. Buffer 5b divides data bus DB connecting I/O devices 31, 32. SData represents data transferred between buffer 5b and CPU 1. PData represents data transferred between buffer 5b and I/O devices 31, 32. Buffer 5b prevents overlap of data PData and SData, in data bus DB.

Control circuit 5c receives address strobe signal $\overline{AS}$(-$\overline{SAS}$) (L) and data strobe signal $\overline{DS}$($\overline{SDS}$)(L) applied from CPU 1, and functions to delay these signals. Further, control circuit 5c sends these signals as chip select signals $\overline{PCS1}$, $\overline{PCS2}$($\overline{CS1}$, $\overline{CS2}$)(L) to I/O devices 31, 32. Transmission of chip select signals $\overline{PCS1}$, $\overline{PCS2}$(L) is prohibited at a fixed time which is before the time when address strobe signal $\overline{AS}$ and data strobe signal $\overline{DS}$ are negated. Read/write signal R/$\overline{W}$ is also inputted to control circuit 5c. When CPU 1 starts a write cycle, control circuit 5c generates a buffer enable signal $\overline{BUFEN}$ which is supplied to buffer 5b in accordance with information contained in address strobe signals $\overline{AS}$(L) and data strobe signal $\overline{DS}$(L). When CPU 1 starts a read cycle, control circuit 5c generates a buffer enable signal $\overline{BUFEN}$, and latch timing signal $\overline{BUFCK}$ for latching the data from I/O devices 31, 32.

Based upon the buffer enable signal $\overline{BUFEN}$ and the read/write signal R/$\overline{W}$ (DIR signal), the side of the data bus DB where the data in buffer 5b is to be transmitted is decided.

Control circuit 5c also receives data strobe acknowledge signal $\overline{PDSACK}$ ($\overline{DSACK1}$, $\overline{DSACK2}$), and sends data acknowledge signal $\overline{SDSACK}$ to CPU 1. Also, buffer 5b receives read/write signal R/$\overline{W}$, and uses this signal as a DIR signal to decide the inputting or outputting direction of buffer 5b. For example, IC 74646 is used as buffer 5b, and a logic circuit is used as control circuit 5c for setting the above logic.

Figure 4:
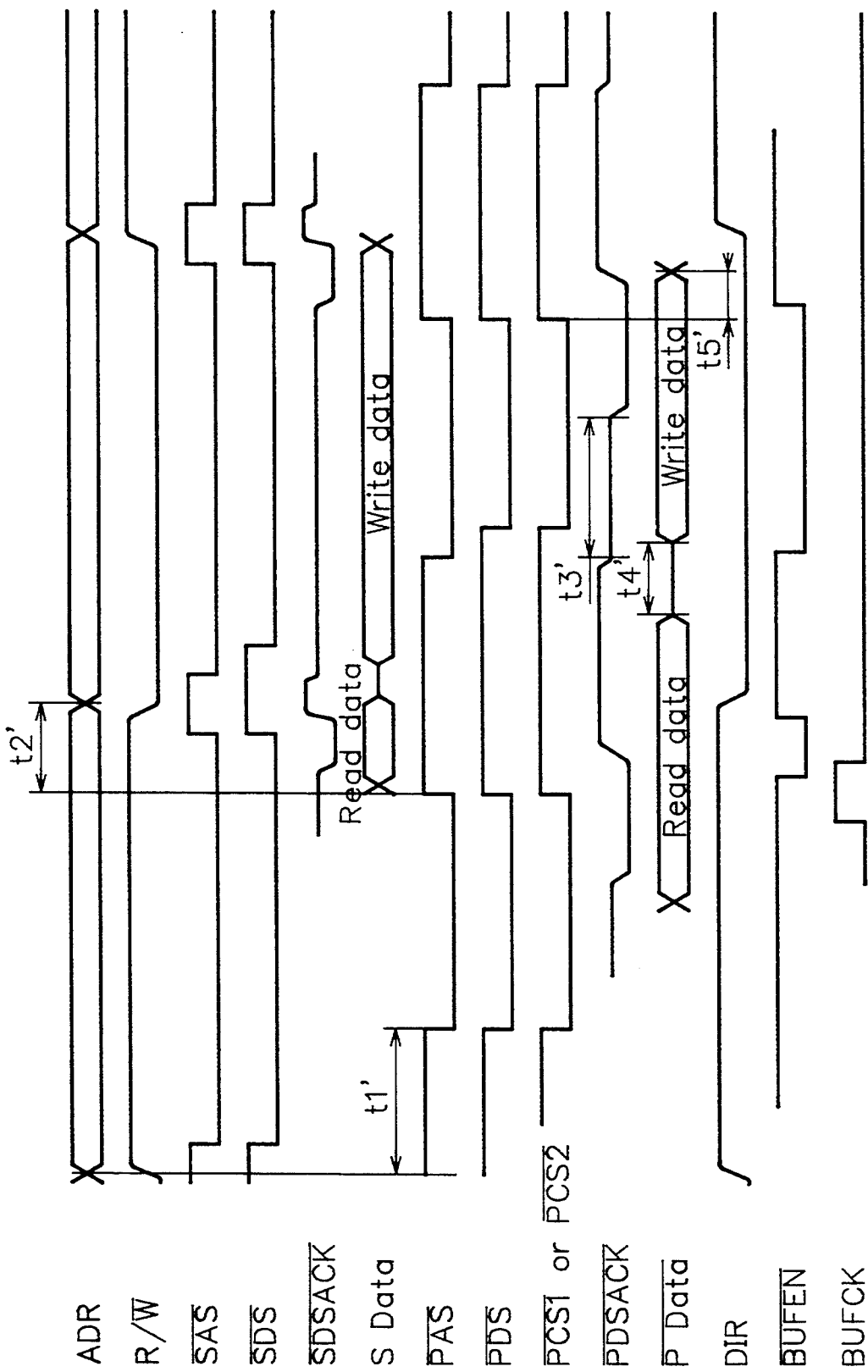
FIG. 4 is a time chart depicting the function of the embodiment of FIG. 3.

FIG. 4 shows the function of bus timing adjusting circuit 5. Assuming that CPU 1 starts a read cycle, CPU 1 transmits address ADR and read/write signal R/$\overline{W}$ (H), and direct address strobe signal $\overline{AS}$($\overline{SAS}$)(L), and data strobe signal $\overline{DS}$($\overline{SDS}$)(L). At this time, I/O direction DIR of buffer 5b is in an H state. Control circuit 5c functions so as to delay both address strobe signal $\overline{SAS}$(L), and data strobe signal $\overline{SDS}$(L) by a time t1', and generates internal address strobe signal $\overline{PAS}$(L), and internal address strobe signal $\overline{PDS}$(L). Control circuit 5c sends chip select signal $\overline{PSC1}$(L) or $\overline{PSC2}$(L) to I/O device 31 or 32 in accordance with the value of address ADR.

Thus, read data PData is transmitted to data bus DB from a specified I/O device 31 or 32 in accordance with address ADR. At the same time, data strobe acknowledge signal $\overline{PDSACK}$($\overline{DSACK1}$ or $\overline{DSAC2}$)(L) is transmitted from I/O device 31 or 32.

Also, control circuit 5c sends latch timing signal $\overline{BUFCK}$(H) to buffer 5b so as to store read data PData in buffer 5b. At this time, control circuit 5c functions to prohibit generation or supply of internal address strobe signal $\overline{PAS}$(L), internal data strobe signal $\overline{PDS}$(L), and chip select signal $\overline{PCS1}$(L).

Later, control circuit 5 functions to enable timing signal $\overline{BUFEN}$(L) to be applied to buffer 5b for a necessary period. Thus, read data SData is transmitted to data bus DB on the CPU side. Then, control circuit 5c transmits data strobe acknowledge signal $\overline{SDSACK}$(L). Based on this signal, CPU 1 introduces SData and the read cycle is ended by this operation.

Meanwhile, assuming that the CPU 1 starts a write cycle, CPU 1 directs address ADR, read/write signal R/$\overline{W}$(L), address strobe signal $\overline{SAS}$(L), and a bit later, data strobe signal $\overline{SDS}$(L). Then, CPU 1 transmits write data SData. Control circuit 5c functions so as to delay address strobe signal $\overline{SAS}$(L) and data strobe signal $\overline{SDS}$(L), and generates internal address strobe signal $\overline{PAS}$(L) and internal data strobe signal $\overline{PDS}$(L) in the same manner as in the above mentioned read cycle. Control circuit 5c sends chip select signal PSC1(L) or PSC2(L) to I/O device 31 or 32 in accordance with the value of address ADR. As a result, the signal line PDSACK has a high impedance (i.e. during time t3'). At this time, I/O direction DIR of buffer 5b is made into an L state by read/write signal R/$\overline{W}$.

Then, control circuit 5c transmits enable signal $\overline{BU}$ $\overline{FEN}$(L) to buffer 5b, which causes write data SData to pass through buffer 5b. Thus, control circuit 5c functions to transmit write data PData to data bus DB on the I/O device side.

The I/O device 31 or 32 sends back data strobe acknowledge signal $\overline{PDSACK}$(L), after it introduces write data PData.

Then, control circuit 5c negates internal address strobe signal $\overline{PAS}$(L), internal data strobe signal $\overline{PDS}$(L), and chip select signal $\overline{PCS1}$(L) or $\overline{PCS2}$(L). Further, control circuit 5c negates buffer enable signal BUFEN(L), and directs data strobe acknowledge signal SDSACK(L) to CPU 1.

As a result, CPU 1 negates address strobe signal SAS(L), data strobe signal SDS(L), and data strobe acknowledge signal SDSACK(L). This ends the write cycle.

As described above, control circuit 5c functions to delay transmission of address strobe signal SAS(L) and data strobe signal SDS(L) from CPU 1; to generate chip select signal PCS1(L), or PCS2(L); and to prohibit transmission of internal data strobe signal PDS(L) and chip select signal PCS1(L) or PCS2(L) before address strobe signal SAS(L) and data strobe signal SDS(L) from CPU 1 are negated. Thus, the invention enjoys at least the following advantages.

1. Sufficient time is provided for set time t1 and hold time t2 of address ADR.

2. After the end of the last time of transmission of data strobe acknowledge signal PDSACK(L), sufficient time t3' is maintained with the signal line PDSACK at a high impedance state.

3. In the write cycle, a sufficient hold time t5' is provided for write data PData.

Since buffer 5b is arranged between CPU 1 and I/O devices 31, 32, data transmitted from CPU 1 and I/O devices 31, 32 can be separated from each other. Thus, advantageously, data from a previous cycle and data in a present cycle are prevented from overlapping each other in data bus DB. The high impedance state shown by time t4' is guaranteed.

Figure 5:
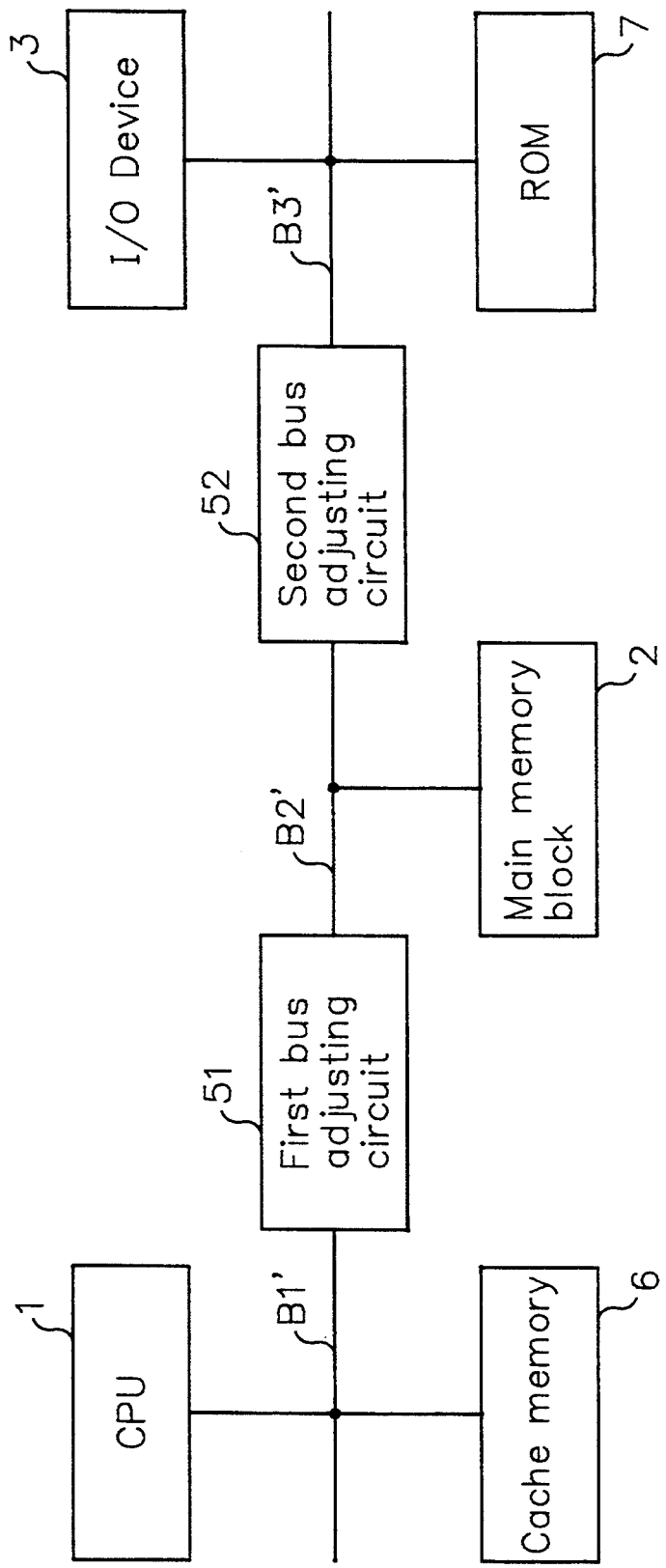
FIG. 5 is a block diagram depicting another illustrative embodiment of the invention.

FIG. 5 shows one example of bus timing adjusting circuits 51, 52 being applied to a system provided with a cache memory. In this example, the first bus timing adjusting circuit 51 is provided between the high speed bus B1' side where CPU 1 and cache memory 6 are connected and the intermediate speed bus B2' side where main memory block 2 is connected. The second bus timing adjusting circuit 52 is provided between the intermediate speed bus B2' side and the low speed bus B3' side where I/O device 3 and ROM 7 are connected.

First and second bus timing adjusting circuits 51 and 52 have similar configurations as the bus timing adjusting circuit 5 shown in FIG. 3 and function in a similar manner. Accordingly, CPU 1 can access each block 51, 52 at an optimal speed.

In accordance with this embodiment, on the high speed bus B1' side, CPU 1 can function at a high speed. Thus, maximum performance can be obtained. Moreover, on the low speed bus B3' side, low speed I/O devices 3 can function at low speed. Therefore, reliable, efficient and flexible operation is obtained by the invention.

Figure 6:
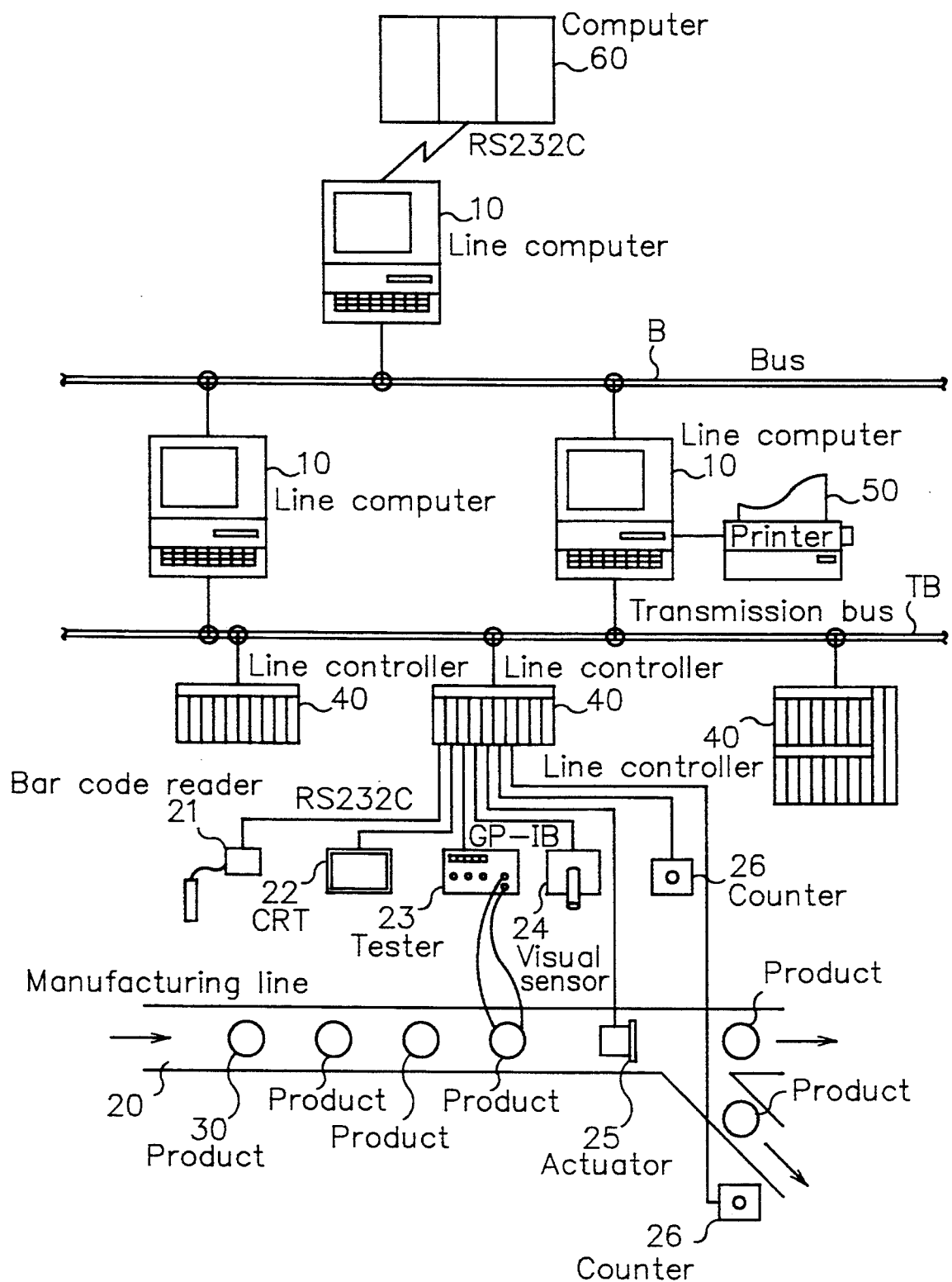
FIG. 6 is a diagram depicting a complete system wherein the line computer of the invention is used in a manufacturing line control system.

Turning now to FIG. 6, a line computer 10 is connected to a transmission bus TB to which a line controller 40 is connected. Computer 10 performs various processing functions with respect to products 30 passing through the manufacturing line 20.

Computer 10 gathers data from line controller 40 and sends instructions thereto. Computer 10 also outputs data received via transmitter bus 7B from line controller 40, as desired, for recording through a printer 50. Computer 10, connected to bus B, is located, for example, in a central control room, and can communicate via another line computer 10 acting as a host intermediate and an ordinary transmission standard signal line, such as an RS232C, to large scale computer 60 to send information regarding the state of the manufacturing line 20.

Controller 40 directly controls the operations of (1) a bar code reader 21, which reads out, through RS232C, a product code of product 30 passing through the manufacturing line 20, i.e. an automatic inspection line; (2) a CRT 22 which displays output results; (3) a tester 23, such as an electrical voltage tester, for testing the operation of product 30 through the GP-IB line; (4) a visual sensor 24 for external appearance testing; (5) an actuator 25 for selecting passable or non-passable products in response to an output signal from visual sensor 24 or other desired sensors; and (6) a counter 26 for counting the number of passable or non-passable products.

Figure 7:
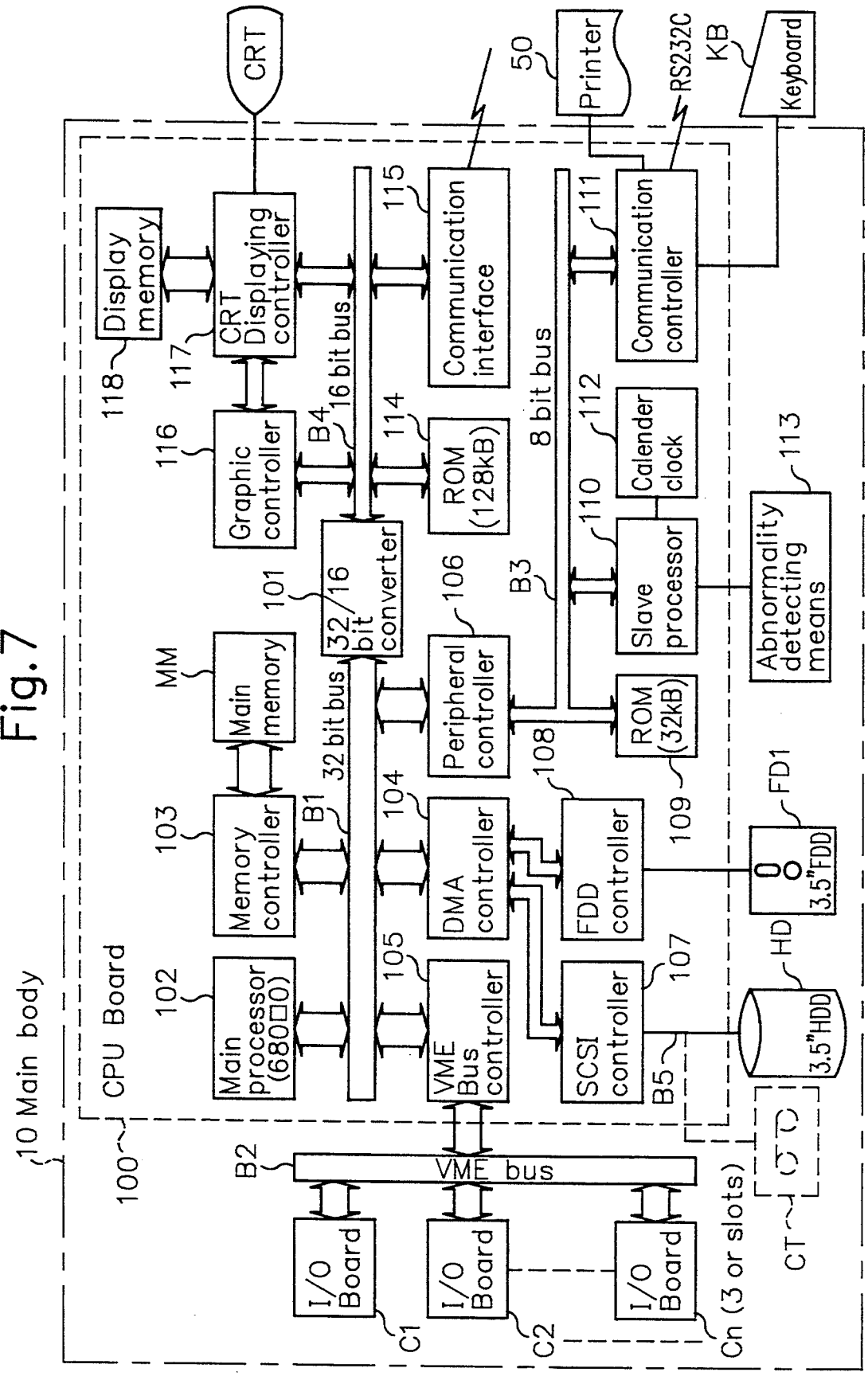
FIG. 7 is a block diagram depicting a CPU board of the invention.

The invention encompasses a line computer having a CPU board in which such a bus timing adjusting circuit, e.g. 5, 51, 52, is disposed. FIG. 7 depicts such a CPU board 100, wherein the above mentioned bus timing adjusting circuit 5 may be a 32/16 bit converter 101. Connected to a 32 bit high speed bus B1 are (1) a main processor 102, such as a 68020, 68030, which operates at a high speed; (2) a memory controller 103 for controlling the main memory MM; (3) DMA controller 104; (4) VME bus controller 105; and (5) a peripheral controller 106. DMA controller 104 controls data transmission from main memory MM to SCSI controller 107 provided with hard disks or FDD controller 108 provided with floppy disks, and vice versa. VME bus controller 105 controls optional communication I/O boards c1, c2, ... cn connected to VME bus B2. Optional boards c1, c2 ... cn are used for communicating with external systems, such as BSC communication, Ethernet communication, GP-IB communication, or MAP communication.

Peripheral controller 106 is connected to an 8 bit bus B3, to which are connected (1) ROM 109, which may be a 32K bit device; (2) slave processor 110; and (3) communication controller 111. Communication controller 111 functions as an interface for printer 50, key board KB, and other systems, such as a transmission line RS232C.

Slave processor 110 is provided with a calender clock 112 which is called "calendar clock" because it has such functions as a calender function, a clock function, or an interruption function for interrupting a software timer. Also, slave processor 110 functions to process signals received from, for example, abnormality detecting means 113 for detecting abnormality of cooling fans or an abnormal temperature rise. Furthermore, slave processor 110 carries out (1) processing of key board inputs applied through communication controller 111; (2) serial communication processing of signals from a transmission line, such as RS232C; or (3) controlling of printer 50 in accordance with printer drive instructions.

Because of operations carried out by slave processor 110, the load of main processor 102 is reduced considerably. Thus, main processor 102 operates more efficiently, reliably and effectively.

On the other hand, the 32/16 bit converter 101 functions to connect a 16 bit bus B4, to which low speed I/O devices are connected, with high speed 32 bit bus B1. Connected to bus B4 are (1) ROM 114, which may be 128K bit device; (2) communication interface 115; (3) graphic controller 116; (4) CRT displaying controller 117 to which are connected a CRT and display memory 118. CRT displaying controller 117 is also connected to graphic controller 116. Graphic controller 116, CRT displaying controller 117 and display memory 118 comprise a block for controlling the CRT display.

As indicated above, 32/16 bit converter 101 controls the timing of high speed main processor 102 and the timing of low speed I/O devices, thereby to provide sufficient time margins as desired.

CALENDER CLOCK

The function of interrupting the software timer is carried out to reduce time error in the calender clock 112 connected to slave processor 110.

In a conventional structure, separate clock generators are used for generating a real time clock for the CPU and for generating a standard clock to run the software program. When line power is turned "Off", the present time is calculated by adding a value counted by the software timer of the standard clock to the time read from the real time clock. Accordingly, when the computer system runs continuously for a long time (e.g. several months) time differences tend to accumulate between the value indicated by the real time clock and the value counted by the software timer. Thus, in the conventional apparatus, it is difficult to recognize the correct time.

In the invention, advantageously, even though the computer system runs for a long period of time or even though power to the computer is repeatedly switched "on" and "off", the clock for identifying the software program works reliably and correctly at all times. In the invention a substantially identical crystal oscillator is used for generating the standard clock for the software timer and for generating the real time clock, so that time error between the software timer and the real time clock does not accumulate. The term "clock" as used herein refers to periodic pulse signals.

Also, advantageously, the means for generating interruption signals to interrupt the software timer is used to reduce the above-mentioned time error, if any, which means comprises a first counting means and a second counting means. The first counting means directs interruption of the software timer at fixed times (termed a first set value). The second counting means directs interruption of the software timer at fixed times (termed the second set value). The first and second counting means are switched alternately to eliminate the above error.

Figure 8:
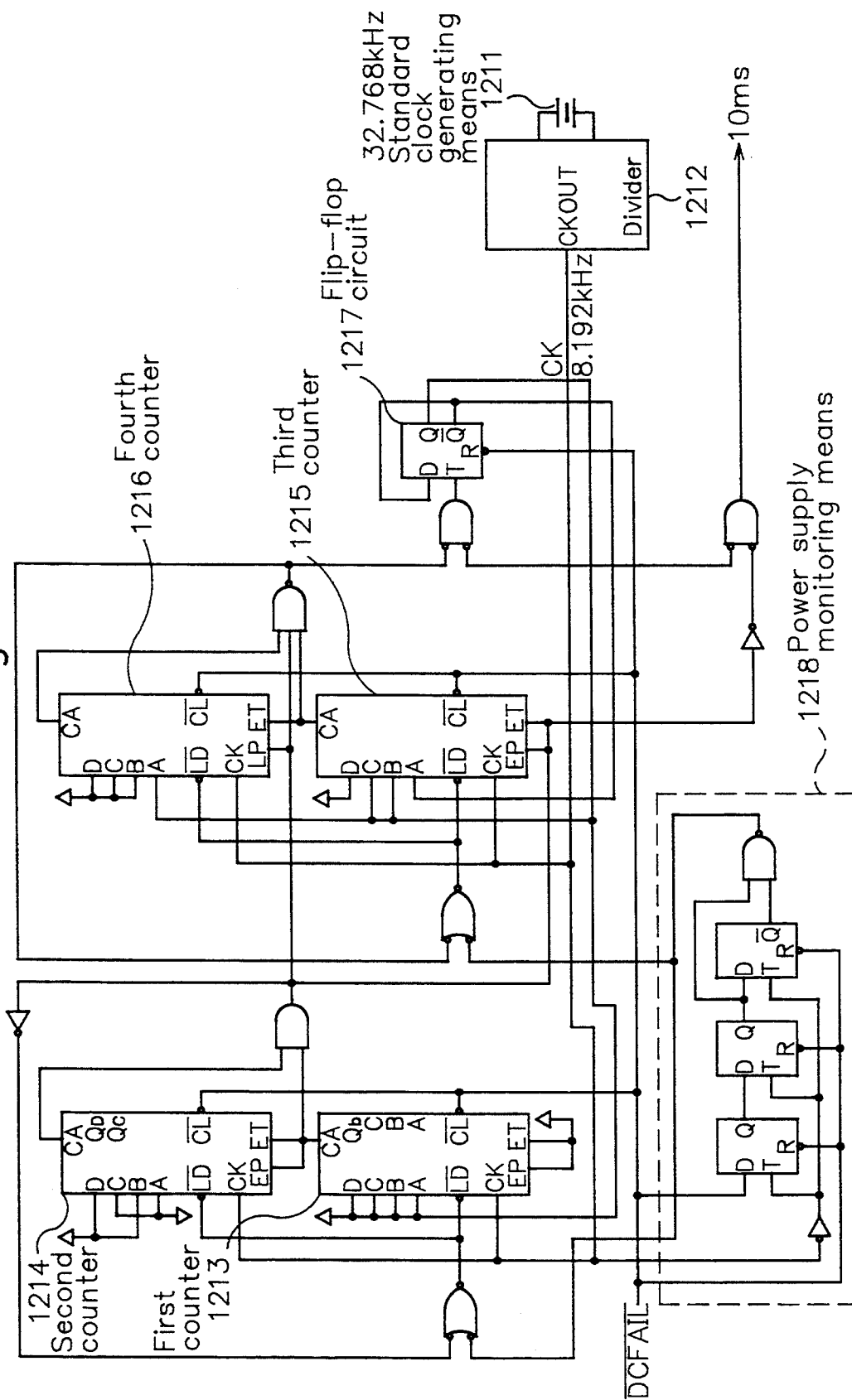
FIG. 8 is a partial diagram depicting a calender clock used in the invention.

FIG. 8 shows one example of an interruption signal generating means for interrupting the software timer. Assume that interruption of the software timer is carried out every 10 ms. Standard clock generating means 1211 outputs a 32.768 kHz clock as a real time clock. Divider 1212 frequency divides the standard clock of 32.768 kHz into 4, and generates a 8.192 kHz clock. The first counter 1213, the second counter 1214, the third counter 1215 and the fourth counter 1216 are 4 bit type up counters. Flip flop circuit 1217 is provided for switching the operational modes and gives instructions to the respective counters to change the initial count values.

Power supply monitoring means 1218 monitors the "on" and "off" states of the power supply, and the power failure or restoration of the power supply; and generates a loading signal $\overline{LD}$ as a count set value to the respective counters in accordance with signal $\overline{DCFAIL}$ generated when the power supply is turned "on".

The functions of the divided clock CK of 8.192 kHz and the interruption every 10 ms of the software timer are as follows. The period of the divided clock CK (i.e. 8.192 kHz) is approximately 0.112 ms. Even though this value is multiplied by an integral number of times, the resultant value is never equal to 10 ms. That is, it takes 9.887 ms to count 81 divided clocks. On the other hand, it takes 10.009 ms to count 82 divided clocks. Interruption is carried out when 81 divided clocks are counted or when 82 divided clocks are counted. As a result, it is possible to keep permissible error to less than 1%. Further, if the operation, which counts 82 divided Clocks CK, is repeated 23 times, and then, if operation, which counts 81 divided clocks CK, is repeated 2 times, the total number of divided clocks is as follows.

$$82 \cdot 23 + 81 \cdot 2 = 2048$$

If 2048 divided clocks were converted to time, it is equivalent to 250 ms. If interruptions were carried out every 250 ms (i.e. 2048 clocks), the cycle of the interruption is equivalent to the integer times (25 times) of 10 ms. In such a case, even an error of less than 1% as described above, cannot accumulate. Accordingly, the invention is commercially advantageous.

Figure 9:
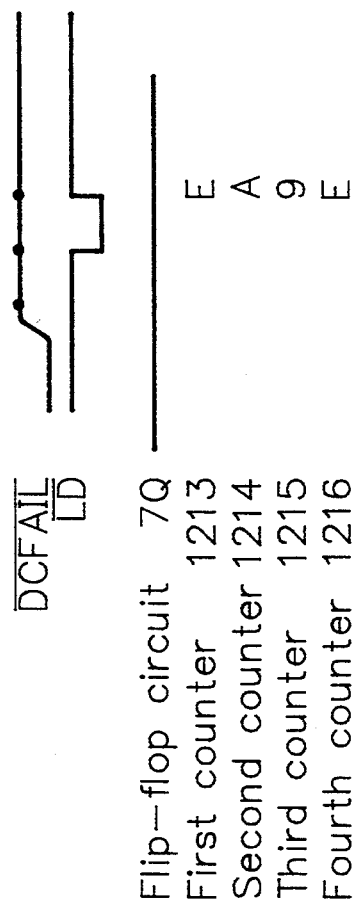
FIG. 9 and FIG. 10 are time charts depicting the function of the calender clock of FIG. 8.

FIG. 9 is a time chart showing the initial state of the apparatus. When the power supply is applied, signal $\overline{DCFAIL}$ turns to an H state, and the apparatus generates load signal $\overline{LD}$(L). As a result, E(hexadecimal) is set to the first counter 1213; A (hexadecimal) is set to the second counter 1214; 9(hexadecimal) is set to the third counter 1215; and E (hexadecimal) is set to the fourth counter 1216. First counter 1213 and second counter 1214 comprise a 82 number counter, and the third counter 1215 and fourth counter 1216 comprise a 23 number counter.

Figure 10:
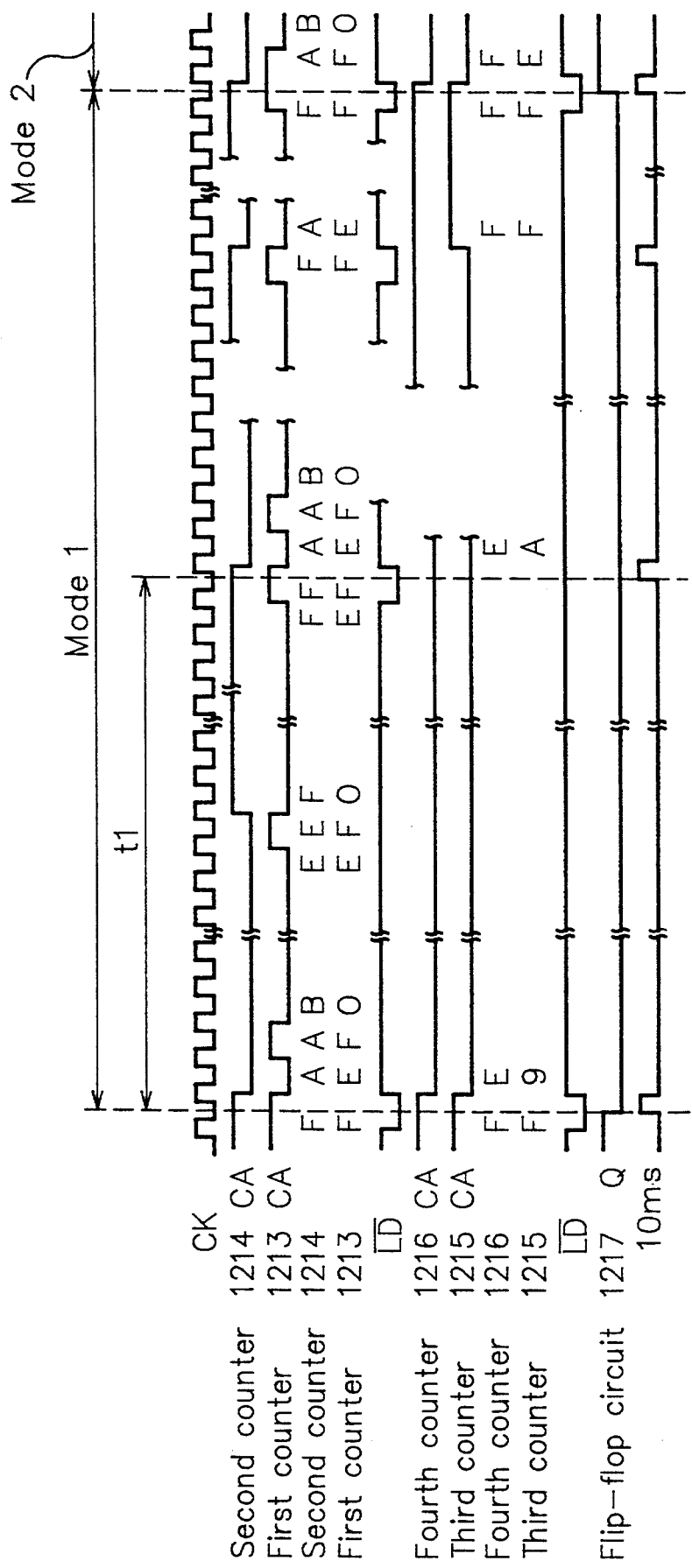

FIG. 10 is a time chart showing the function of the calender clock in the invention, wherein Mode 1 shows the reset state of flip flop circuit 1217. At the start of time t1, E (hexadecimal) is set to first counter 1213 and A (hexadecimal) is set to second counter 1214; furthermore, 9 (hexadecimal) is set to third counter 1215, and E(hexadecimal) is set to fourth counter 1216.

From this state, the calender clock starts to count the divided clock CK. First counter 1213 generates carry output CA(H) when first counter 1213 counts clock CK up from F. Second counter 1214 counts carry output CA(H) from first counter 1213. First counter 1213 and second counter 1214 count 82 clocks of divided clock CK in time duration t1, and after 10.009 ms from the start, transmit a 10 ms interruption signal (H).

Third counter 1215 and fourth counter 1216 comprise a 23 number counter, which counts AND (i.e. logical multiplication) of carry output CA from first counter 1213 and carry output CA from second counter 1214. That is, the 23 number counter generates an output after an operation for counting 82 clocks of divided clock CK, is repeated 23 times (i.e. the above mentioned first set value).

On the basis of the carry outputs from third counter 1215 and fourth counter 1216, flip flop circuit 1217 is inverted from a reset state to a set state, and the state of the apparatus is changed to Mode 2.

In Mode 2, F (hexadecimal) is set to first counter 1213, and A (hexadecimal) is set to second counter 1214. These counters comprise an 81 number counter. Furthermore, E (hexadecimal) is set to third counter 1215, and F (hexadecimal) is set to fourth counter 1216. These counters comprise a binary counter.

In Mode 2, third counter 1215 and fourth counter 1216 count 81 clocks of divided clocks CK, and after 9.8871 ms, transmit a 10 ms interruption signal to the software timer. Third counter 1215 and fourth counter 1216 generate carry outputs CA after the operation for counting 81 clocks of divided clock CK is repeated 2 times (i.e. the above mentioned second set value).

On the basis of the carry outputs, flip flop 1217 is inverted from a set state to a reset state, and the state of the apparatus is changed to Mode 1.

Briefly, the calender clock functions as follows. In the first Mode, operation of counting 82 clocks of divided clock CK is carried out 23 times, and an interruption signal of 10.009 ms is generated in each operation. After that, the apparatus is changed to the second Mode. In the second Mode, operation of counting 81 clocks of divided clock CK is carried out 2 times, and an interruption signal of 9.887 ms is generated in each operation.

Advantageously, the calender clock generates and applies to the software timer an interruption signal which has no time error.

Moreover, the calender clock can set the apparatus to an initial state in accordance with signal $\overline{DCFAIL}$ applied from power source monitor 1218 and can restart operation to generate the interruption signal, even though the power supply is shut down during the operation. As described above, the calender clock which is used to run the software program advances accurately and correctly and does not generate any error, even though the computer system is operated continuously for a long period of time or the power supply is turned "off" during the operation.

DISPLAY APPARATUS

Returning now to FIG. 7, the 16 bit bus B4 includes a 128 kB ROM 114 and communication interface 115 connected to other line computers or other line controllers so as to conduct data exchange. Also, the 16 bit bus B4 includes graphic controller 116 which directs the graphic display and CRT displaying controller 117 provided with display memory 118. Graphic controller 116 writes graphic data in a frame buffer area in display memory 118. Display memory 118 also has an area for storing character display data, whereby CRT controller 117 conducts CRT display control with a mixture of graphic data and character data.

Advantageously, the above objects are attained by the invention which features a simply structured line computer using a small number of chips or gates. For example, the memory areas of a single memory element is divided into multiple areas to store character codes, attribute data, and font pattern in each area. When display operation starts, the character control apparatus conducts time sharing operation in one display cycle, so that read operation of the code area, read operation of the attribute area, read/write access to the CPU, and read operation of the font area are carried out in a time sharing manner in one display cycle, or so that simultaneous read operation of the code area and the attribute area, read/write access to the CPU, and read operation of the font area are carried out in a time sharing manner in one display cycle.

Figure 11:
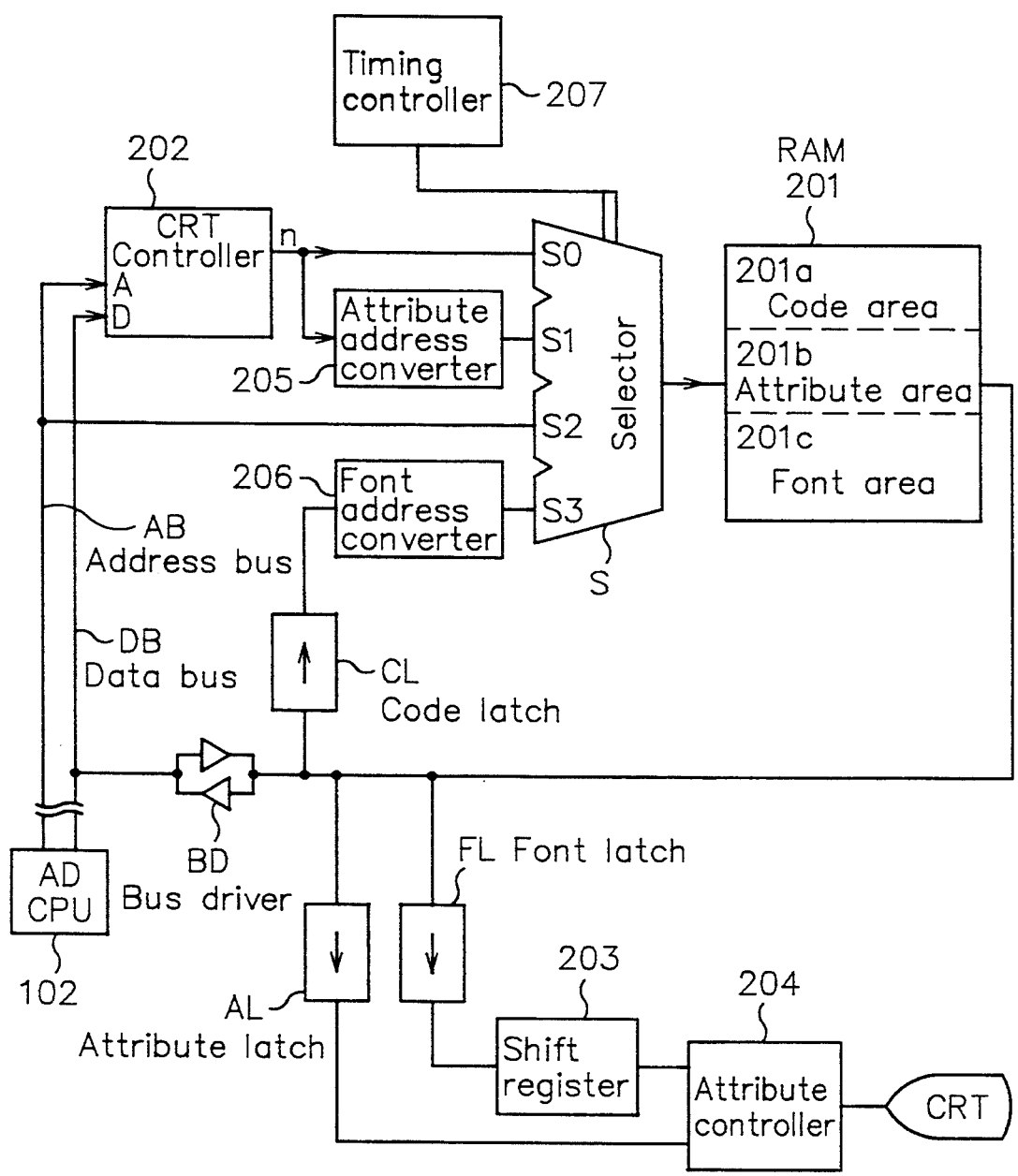
FIG. 11 is a block diagram depicting the character display control part of the invention.

FIG. 11 depicts a character displaying apparatus wherein a single RAM 201 is divided into 3 memory areas, that is, code area 201a, attribute area 201b, and font area 201c to store previous character code, attribute data and font pattern in respective data areas.

When a character is to be displayed, upon instructions from main processor 102, CRT controller 202 generates a display address signal used for scanning, in accordance with the display address, and the corresponding font pattern is applied to shift register 203. Attribute controller 204 executes CRT displaying by referring to these font pattern and attribute information.

In FIG. 11, display address n generated from CRT controller 202 is applied to terminal SO of selector S and to attribute address converter 205. Attribute address converter 205 receives display address n from CRT controller 202, and generates a scan address which corresponds directly to the character code stored in code area 201a. Then, attribute address converter 205 sends a converted address to terminal S1 of selector S.

Display address n from terminal SO of selector S is applied to code area 201a in RAM 1041, so as to read out the corresponding character code. The read out character code is latched by code latch CL, and then is set to font address converter 206.

Font address code converter 206 converts the applied character code to a font address code so as to read out the corresponding font pattern from font area 201c in RAM 201, and sends this font address to terminal S3 of selector S.

Attribute data and font pattern read out from RAM 201 are latched by attribute latch AL and font latch FL, respectively.

On the other hand, address bus AB which is connected to CPU 102 is connected to terminal S2 of selector S, and data bus DB is connected to bus driver BD. Timing controller 207 controls respective timing of selector S, attribute latch AL and font Latch FL.

Figure 12:
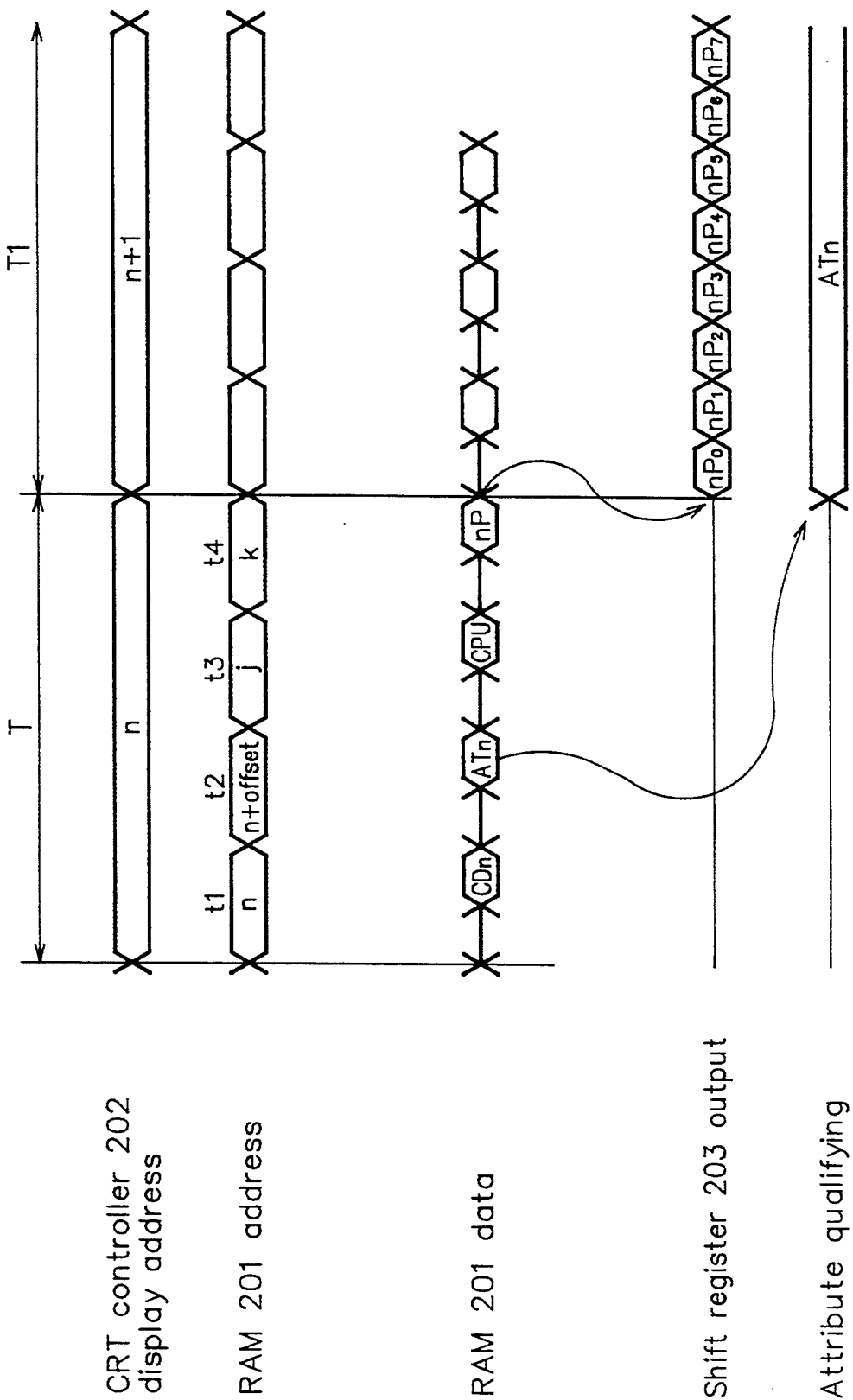
FIG. 12 is a time chart depicting the function of the character display control part of FIG. 11.

The function of the apparatus will now be explained with reference to the time chart of FIG. 12. Display cycle T starts when display address n is applied from CRT controller 202. By using the timing output from timing controller 207, terminal SO of selector S is selected, and then character code CDn is read out from code area 201a in RAM 201 according to display address n, and the read out data is latched to code latch CL, during period t1.

Then, terminal S1 of selector S is selected and the output, for address n for attribute address area+offset, of attribute controller 204 is applied to attribute area 201b in RAM 201, in accordance with this attribute address; and attribute data ATn is latched with attribute latch AL, during period t2. In this case, attribute data ATn is delayed for a time necessary for qualifying serial display pattern data later.

Then, terminal S2 of selector S is selected, and in period t3, main processor 1 executes random access to RAM 201, in accordance with the address transmitted from main processor 1. Furthermore, terminal S3 is selected, and access to font area 201c in RAM 201 is executed in accordance with the font address applied from font address converter 206. The read out font pattern np is latched with font latch FL (period t4).

In the next display cycle T1 of which display address is n+1, display data stored in RAM 201 is read out in the same manner as discussed above. On the other hand, font pattern np (e.g. np0, np1, ... npn) of font latch FL is loaded in shift register 203. Font pattern np is sent to attribute controller 204 together with attribute data ATn from attribute latch AL. Thus, display is executed with the CRT.

As described above, RAM 201 is divided into multiple areas and different data are stored separately in these areas. In one display cycle, RAM access is carried out by a time sharing processing. If the width of the data is sufficiently large, both character code CDn and attribute data ATn can be accessed at the same time.

In the character display controller, the memory area is divided into multiple areas, and in the respective parts, code data attribute data and font data are stored. When these data are displayed, the data are read out in a time sharing manner from the respective areas. Thus, advantageously, the number of memory elements is substantially reduced by the invention.

Furthermore, in the embodiment of FIG. 11, if CRT controller 202, shift register 203, attribute controller 204, attribute address converter 205, font address code converter 206, timing controller 207, selector S, code latch CL, font latch FL, attribute latch AL, and bus BD may be configured win a gate array so that the number of pins is reduced to a minimum, and the total number of elements is reduced substantially.

I/O BOARDS; FAILURE DETECTION

Returning now to FIG. 7, wherein the periphery of VME bus controller 105 is connected to a 32 bit bus B1, VME bus controller 105 controls, through VME bus B2, I/O boards C1, C2, ... Cn, which are of a board type, and optional equipment for processing communications.

The I/O boards include, for example, (1) an I/O board having an interface function to connect with other line computers; (2) an I/O board having an interface function with lower level controllers which conduct, between field instruments, signal transmission and signal reception for signals, such as contact signals, analog signals, or digital signals; (3) an I/O board having an interface function with an auxiliary memory, such as a cartridge tape device, or a floppy disk device; (4) an I/O board having communicating facility with GP-IB instruments; (5) an I/O board having an interface function which satisfies such standards as RS232C, RS422, or RS485; (6) an I/O board disposed between a semiconductor manufacturing apparatus and computers, which is structured in accordance with various communication procedures, such as SECS (SEMI Equipment Communications Standard; wherein SEMI is the Semiconductor Equipment and Materials Institute); (7) an I/O board which supports BSC (Binary Synchronous Communication ) communications; (8) an I/O board which supports Ethernet communications; or (9) an I/O board which supports MAP (Manufacturing Automation Protocol) communications.

In the conventional apparatus, a board driver provided in each I/O board monitors, by use of a timer, response from the I/O board which is accessed by the main processor 102, and detects failure of the I/O board immediately after access time is over. When the I/O board becomes inoperative due to hardware trouble or software trouble, the main processor was unable to detective the inoperative state until the timer timing was over. Therefore, the conventional apparatus was deficient in that failure might spread to the entire system and the entire system might be adversely affected before the failure was detected, Also, other problems may arise.

On the other hand, in the invention, the abnormality of each I/O board is promptly detected and such state of abnormality is signalled to a main processor, so that the effect of the failure is minimized. In the invention, the I/O board outputs a fail signal when the I/O board by itself detects an abnormality. The board driver which receives the fail signal from the abnormal I/O board, gives self diagnosis instructions for a corresponding I/O board.

If the result of the self diagnosis is abnormal, the concerned I/O board is cut off, and further, the board driver is assumed to be an error driver.

Figure 13:
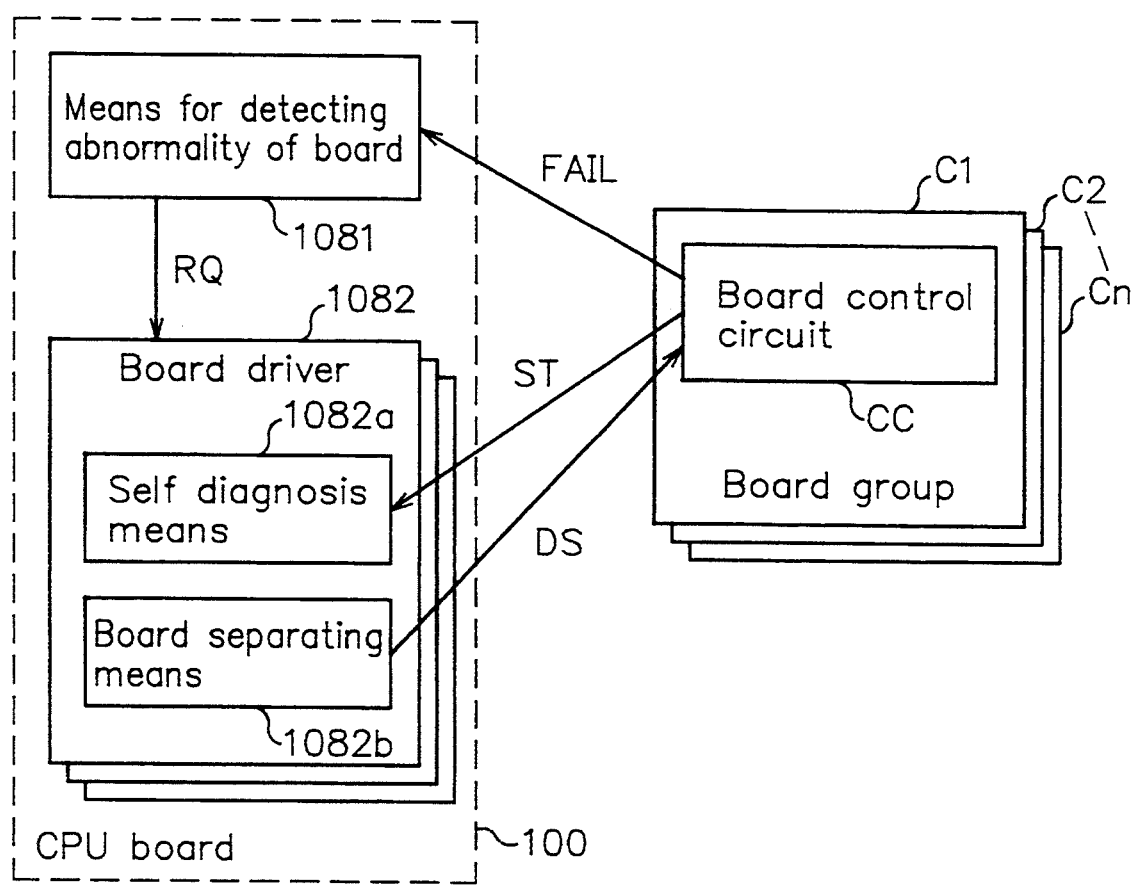
FIG. 13 is a schematic diagram depicting the connection of the I/O board of the invention.

FIG. 13 shows a system wherein an abnormality is detected comprising main processor 102, VME bus controller 105, and a plurality of I/O boards C1, C2 ... Cn. See also FIG. 7. CPU board 100 is connected, through VME bus controller 105, to I/O boards C1, C2 ... Cn. Board control circuit CC which functions to output fail signal FAIL to CPU board 100, is provided in each I/O board.

In CPU board 100, means 1081 for detecting abnormality in the board is provided, which functions to generate a diagnosis request signal when fail signal FAIL is applied from board control circuit CC, and further, board driver 1082 is provided in each I/O board C1, C2 ... Cn.

Board driver 1082 is software executed by main processor 102, main memory MM and VME bus controller 105 shown in FIG. 7. Board driver 1082 includes the following functions: (1) normal function to control regular operation of the I/O board; (2) self diagnosis function 1082a to conduct diagnosis in accordance with the self diagnosis request RQ and to receive the result ST of the self diagnosis; and (3) function 1082b to separate, in accordance with the result ST of the self diagnosis, the troubled I/O board from CPU board 100, and to change the concerned board driver 1082 to an error state so as to stop the operation of the board driver.

Figure 14:
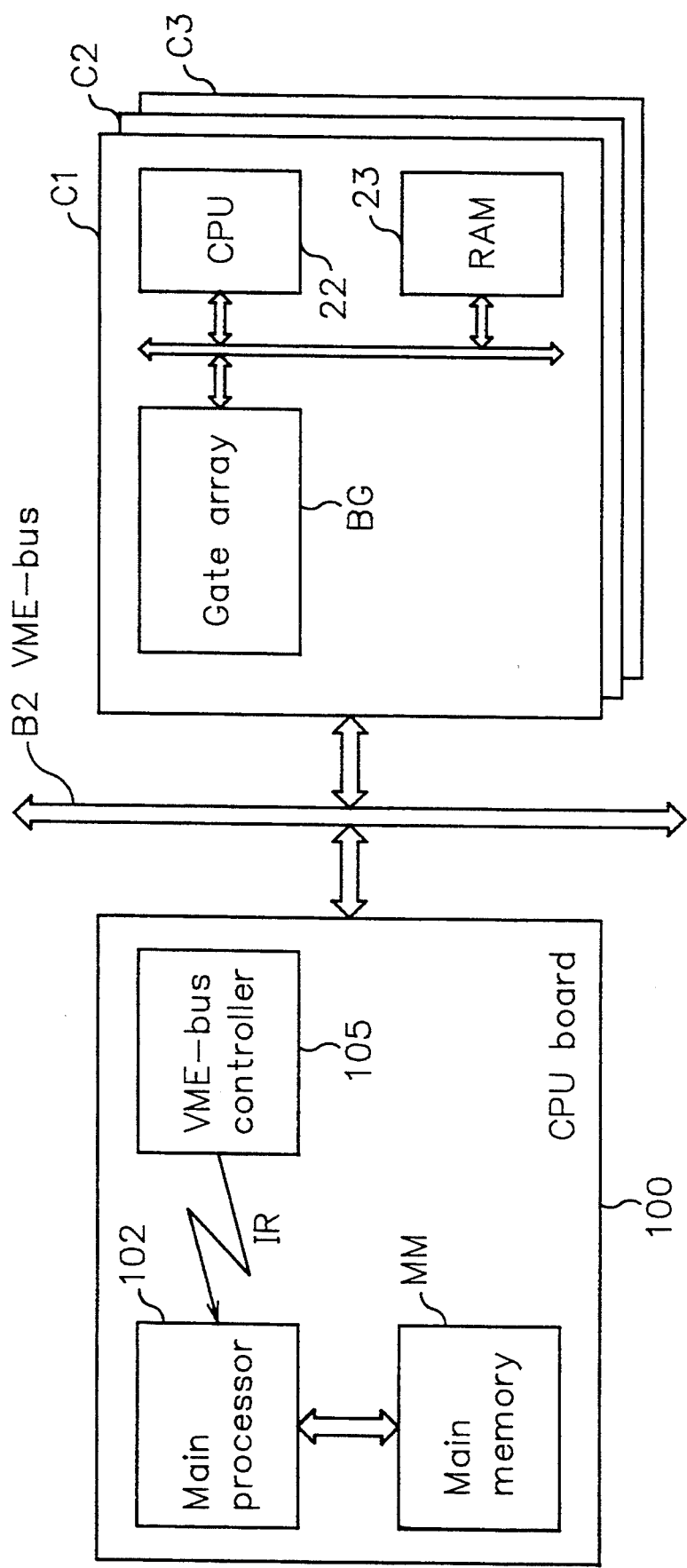
FIG. 14 is a schematic diagram depicting a hardware conceptualization of the I/O board of the invention.

FIG. 14 shows the hardware structure of the invention, wherein VME bus controller 105 is constituted by a gate array, and further, in each I/O board, gate array BG is arranged. When the installed I/O board becomes abnormal(or normal), gate array BG on the I/O board side generates (or terminates) the fail signal FAIL, and transmits the normal (or abnormal) status of the I/O board through an internal register.

Also, a fail signal line is provided in VME bus B2, thereby to carry fail signal FAIL generated on the I/O board side. VME bus controller 105 functions to send fail signal FAIL, as an interrupt signal IR, to main processor 102.

Figure 15:
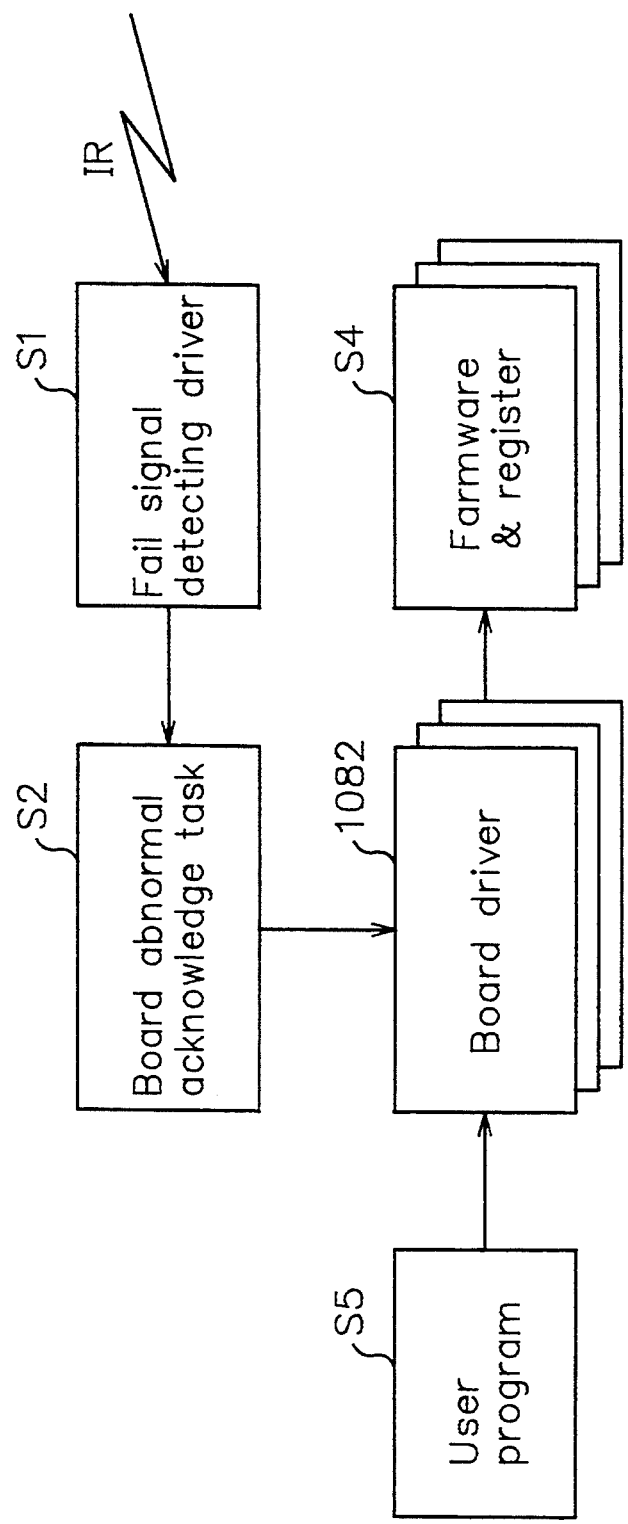
FIG. 15 is a schematic diagram depicting a software conceptualization of the I/O board of the invention.

FIG. 15 shows conceptually the software of the invention. The software concept includes the following: (1) a fail signal detecting driver S1 which accepts fail signal FAI1 as an interrupt signal IR; (2) a board abnormal acknowledge task S2 started by fail signal detecting driver S1; (3) a board driver 1082 wherein self diagnosis operation is requested by board abnormal acknowledge task S2; and (4) a user program S5/operate board driver 1082. Farmware and register S4 is a software block on the I/O board side used to execute self diagnosis operation by board driver 1082.

The function of the software structure is as follows. For example, when an abnormality occurs on the I/O board side, such that a watch dog timer detects the abnormality, gate array BG on the I/O board side transmits a fall signal FAIL on bus B2. VME bus controller 105 detects this fail signal FAIL on bus B2, and sends an interrupt signal IR to main processor 102.

When main processor 102 receives interrupt signal IR, the software shown in FIG. 15 is executed. Namely, fail signal detecting driver S1 detects interrupt signal IR, and notifies board abnormal acknowledge task S2 of this abnormality. When aboard abnormal acknowledge task S2 detects the abnormality of the I/O board, this abnormal state is signalled to board driver 1082, and the board driver requests a corresponding I/O board to conduct self diagnosis. The self diagnosis is executed by board driver 1082.

Board driver 1082 reads an internal register of gate array BG on the I/O board side, and confirms whether or not the I/O board is still in the abnormal state.

When board driver 1082 acknowledges an abnormal state, board driver 1082 works upon gate array BG so as to prohibit signal transmission of fail signal FAIL therefrom. Simultaneously, board driver 1082 is changed by itself into an error state, so that it can not access the failed I/O board. Namely, it can be assumed, in a hardware sense, that board driver 1082 functions to separate the abnormal I/O board from CPU board 100. As a result, even if user program S5 accesses board driver 1082 which has changed to an error state, board driver 1082 replies with an error signal. That is, it can be assumed, in a software sense, that board driver 1082 functions to separate the abnormal I/O board from CPU board 100.

As just discussed, the failed I/O board can be separated from the CPU board promptly, from both the hardware view point and the software view point. Thus, advantageously, abnormality of each I/O board is promptly signalled to the main processor 102, so that the effect of the failure, such as system shutdown or hangup, is minimized.

FLOPPY DISK APPARATUS

Returning to FIG. 7, floppy disk drive controller 108 is, for example, a 3.5 inch floppy disk driver FD1 connected to floppy disk drive controller 108. In addition, increased demand often occurs, such that a 5 inch floppy disk drive, or an 8 inch floppy disk drive must be connected as the system expands. Generally, the 5 inch floppy disk drive and the 8 inch floppy disk drive are connected to a 3.5 inch floppy disk driver FD1 using a daisy chain connection method.

However, in the conventional daisy chain system, when the tail drive having a terminal resistor is detached, the daisy chain becomes open, and thus, it is necessary to install newly a terminal resistor in the new tail disk drive. Further, when all floppy disk drives are detached from the daisy chain, a terminal resistor must be installed in the main body unit 10 side.

Furthermore, when the power supply of the tail floppy disk drive is turned "off", the signal at the terminal resistor turns from a "pull up" state to a "pull down" state.

In the above case, it is impossible to execute read/write access to a 3.5 inch floppy disk drive FD1.

To overcome the above drawbacks, in the daisy chain system of the invention, terminal resistors are installed in all floppy disk drives connected to the daisy chain. As a result, any floppy disk drive may be freely detached. Furthermore, in each floppy disk drive, buffers are provided in parallel with an internal receiver. Thus, even when any of these floppy disk drives is turned "off", there occurs no adverse effects.

Figure 16:
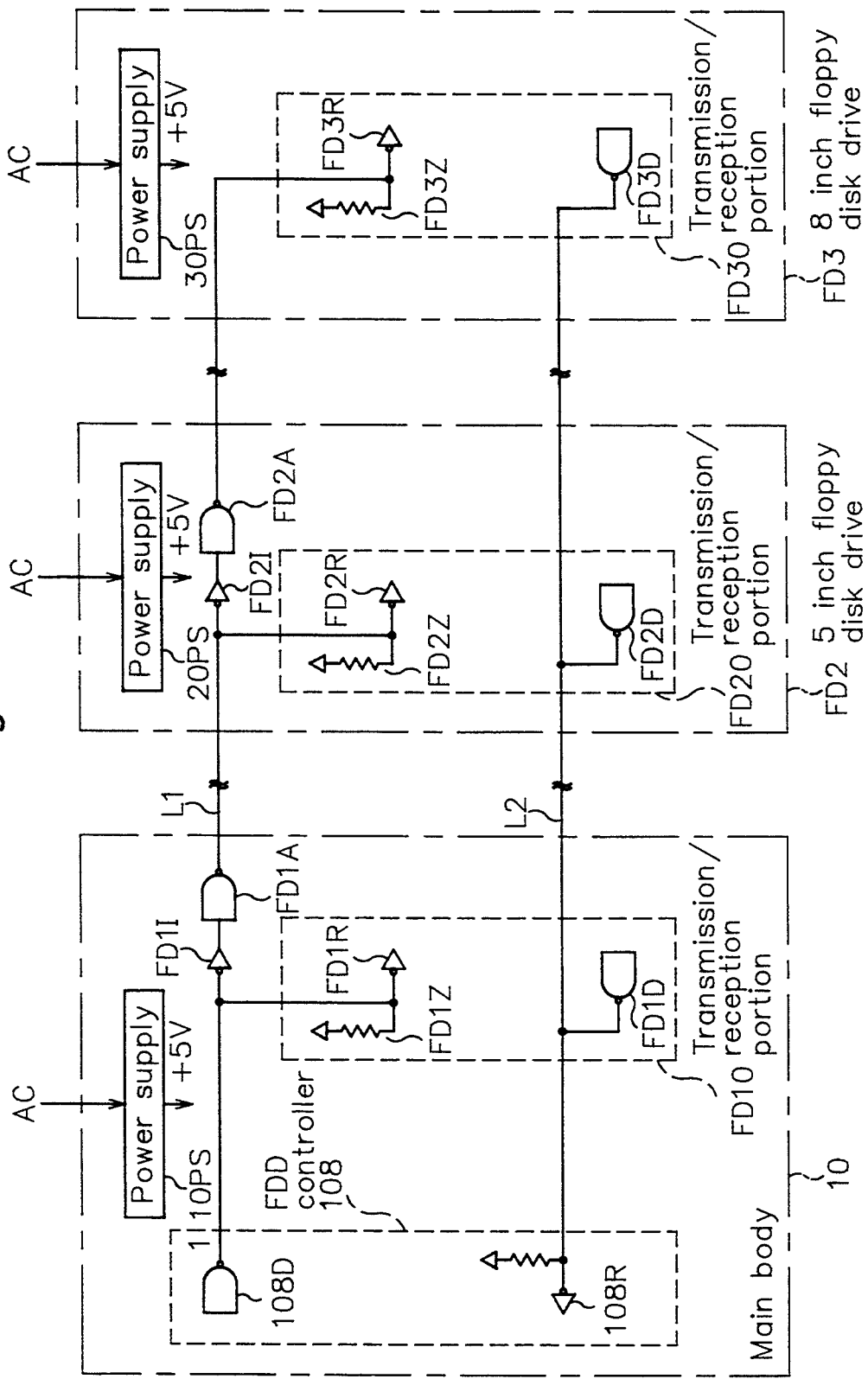
FIG. 16 is a schematic diagram depicting the connection of floppy disk drive units used in the invention.

FIG. 16 shows the connections of the floppy disk drive system of the invention, wherein, for these examples, a 5 inch floppy disk drive FD2 and an 8 inch floppy disk drive FD3 are connected, by a daisy chain structure, to transmission/reception portion FD10 for a 3.5 inch floppy disk drive arranged in main body 10, through lines L1 and L2.

A feature of the system is that terminal resistors FD1Z, FD2Z and FD3Z are connected to daisy chain receivers FD1R, FD2R, and FD3R of transmission/reception portions FD10, FD20 and FD30 in each floppy disk drive.

Furthermore, another feature of the system is that a buffer, comprising receiver FD1I and driver FD1A, is connected in parallel with daisy chain receiver FD1R in main body unit 10.

In the same manner, in a 5 inch floppy disk drive FD2, a buffer, comprising receiver FD2I and driver FD2A, is connected in parallel with daisy chain receiver FD2R.

In the embodiment, terminal resistors are disposed in all floppy disk drives to be connected to the daisy chain, and each floppy disk drive is connected, through a buffer, comprising a receiver and a driver, to the next floppy desk drive.

Assuming that a 5 inch floppy disk drive FD2 or an 8 inch floppy disk drive FD3 becomes unnecessary in operation, when one of these floppy disk drives is detached from the system, the floppy disk drive previous to the detached floppy disk drive becomes a new tail drive. In this case, since all floppy disk drives have terminal resistors, it is unnecessary to install a terminal resistor in the new tail drive.

Assuming that a new floppy disk drive is connected to the daisy chain, since in this floppy disk drive, a terminal resistor is also installed, there occurs no adverse affect.

Next, assuming that the power supply of the 5 inch floppy disk drive FD2 or the 8 inch floppy disk drive FD3 is turned "off", an output signal from driver 108D of floppy disk controller 108 in main body unit 10 is isolated by receiver FD1I and driver FD1A from the external floppy disk drives. Thus, floppy disk controller 108 is not adversely affected by resulting from the cut off of the power supply in the external floppy disk drives.

For example, an open collector type is used for the signal output of the external floppy disk drive. Thus, the main body 10 and the respective floppy disk drives are not adversely affected by the cut off of the power supply in other floppy disk drives.

The invention floppy disk drive connection enjoys various advantages, such as, for example, (1) It is not necessary to install a terminal resistor in the drive unit previous to the tail drive when the tail drive is detached from the daisy chain; (2) The system is not adversely affected even when the power supply of the external floppy disk drive is switched "off"; (3) The floppy disk drives may be freely connected to or detached from the main body unit; and (4) The system configuration can be readily changed because the turning "on" and "off" of the power supply can be done arbitrarily.

CONTROL METHOD

The software program to be loaded in the above hardware structure is as follows. In factory automation, the line computer controls various types of equipment installed at a manufacturing line site. In the line computer, an interpreter type language is loaded in order to execute real time processing. In general, these control programs use a BASIC interpreter type language. When the control program is inputted, the BASIC interpreter disposed in the line computer generates middle codes, and then the control program is executed by interpreting the middle codes.

The program language may include such compiler type language as the C language, other than the above interpreter type language. In case the program comprises the compiler type language, the program can be executed at high speeds since the program can be converted into an execution form program by the compiler.

In the factory automation field, the compiler type language has to be used where generally high speed processing is necessary. In fact, use of control programs described by the compiler language has been increasing.

However, in the conventional apparatus, it is difficult to prepare a program which is converted in execution form by the compiler type language, wherein the program which is desired to be in the middle would exist in the middle word area of the interpreter type language and in the user area of the memory, for the following reasons: (1) The interpreter of the system is not provided with a function to load such execution type program; (2) Since the method for delivering arguments from the interpreter type program to the execution type program depends upon the language type, the interface therebetween can not be determined uniquely; and (3) The address value corresponding to the position dependence type code in the execution form program is influenced by amendment of the interpreter type language.

On the other hand, in the invention, the execution form program prepared by the compiler type language can be included in the interpreter type language program. The method for preparing the execution form program made by the compiler type language to be contained in the interpreter type language program, is as follows: (1) In accordance with an adapter procedure, the arguments in the interpreter type language program are taken into the execution type program side, and a main function is set therefor; (2) The static variables in the execution form program are copied from the data area to a first static area, every time the interpreter type program is executed; and (3) When the interpreter type program involves places to be amended, by a pre-run processing, all the contents of the branching destination addresses specified by all position dependence codes in the execution form program, are rewritten. By the above procedures, the system enables the coexistence of the different programs.

Figure 17:
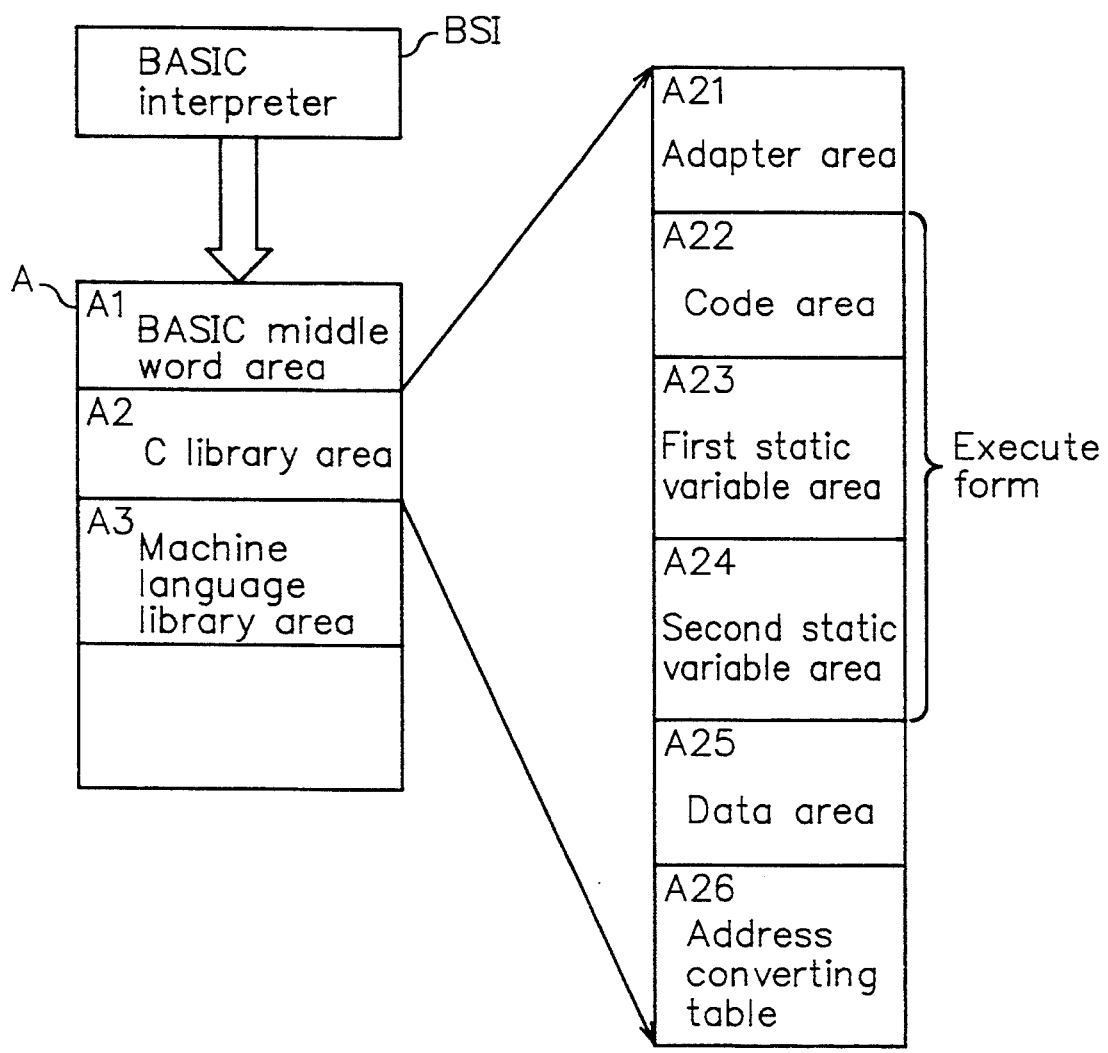
FIG. 17 is a diagram depicting allocation of software programs in the user memory areas when different language programs are loaded in the invention.

FIG. 17 shows the allocation of software programs in user memory area A, in which the execution type program made by the compiler type language is loaded in the middle word area A1 of the interpreter type program. In this example, a BASIC language is used for the interpreter type language, and a C language is used for the compiler type language.

Namely, the user area A of the memory is constituted by a BASIC middle word area A1 whereat the BASIC middle word is set; C library area A2 whereat C language library is set; and machine word library area A3 whereat the machine language library is set. In the usual operation, BASIC interpreter BSI reads the BASIC middle word area A1, and executes same.

In addition, in the C library area A2 are set (1) adapter area A21; (2) code area A22 for storing the code actually used by the user; (3) first static variable area A23 for storing the static variable of which an initial value is set; (4) second static variable area A24 of which an initial value is not set; (5) data area A25 for storing the initial value of the static variable; and (6) address converting table A26 for rewriting the address values of the position dependent code in code area A22.

In the conventional apparatus, the C library of the execution form, described in the user area, is configured from code area A22, first static variable area A23, and second static variable area A24. On the other hand, in the invention, adapter area A21, data area A25, and address converting table A26, are additionally provided in this area.

The details of the functions of the areas A21, A25, and A20 are as follows. BASIC interpreter BSI calls adapter area A21 through a common interface which functions to call the compiled execution program as a subroutine. The programs in adapter area A21 function to pile various arguments in the BASIC middle word in a stack, and call the main function in the C library.

The initial value data to be set in the first static variable area A23, is stored in data area A25, and is copied to first static variable area A23 when the pre-run of BASIC interpreter BSI is carried out. Second static variable area A24 whereat a static variable having no set initial value is stored, is initialized to 0 when the above pre-run is carried out.

The pre-running of the BASIC interpreter BSI means such processing as carried out prior to program execution in order to secure data or processing table area to De used at an execution period.

If a BASIC program is changed, after the C .language is loaded into the BASIC middle word area, the position of the C library on the user memory area A may shift since the C library includes such position dependent codes as branch instruction or jump instruction.

Accordingly, if the position of the C library shifts, the branch destination address specified by the inside instruction code shifts from the address of the instruction code to be actually executed. Thus, it is difficult to execute the C library correctly.

Figure 18:
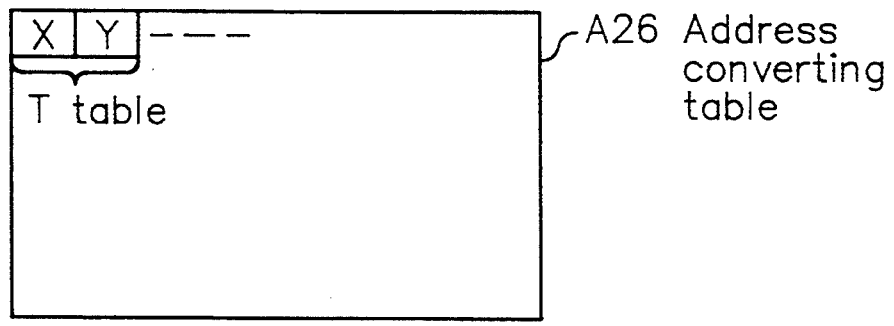
FIGS. 18 and 19 are explanatory diagrams depicting the function of converting the C library.

However, in the invention, by pre-run processing of the BASIC program, the branch destination address in the position dependent code is converted in accordance with address converting table A26. FIG. 18 shows the configuration of the address converting table A26, wherein table T is allocated to each position dependent type code. In Table T, value X represents a relative address value from the top address to the position dependent code address in C library area A2, and value Y represents the relative address value from the top address to the branch destination address in C library area A2.

Tables T(X,Y) are arranged in address converting table A26 in response to the number of position dependent codes in the C library.

Figure 19:
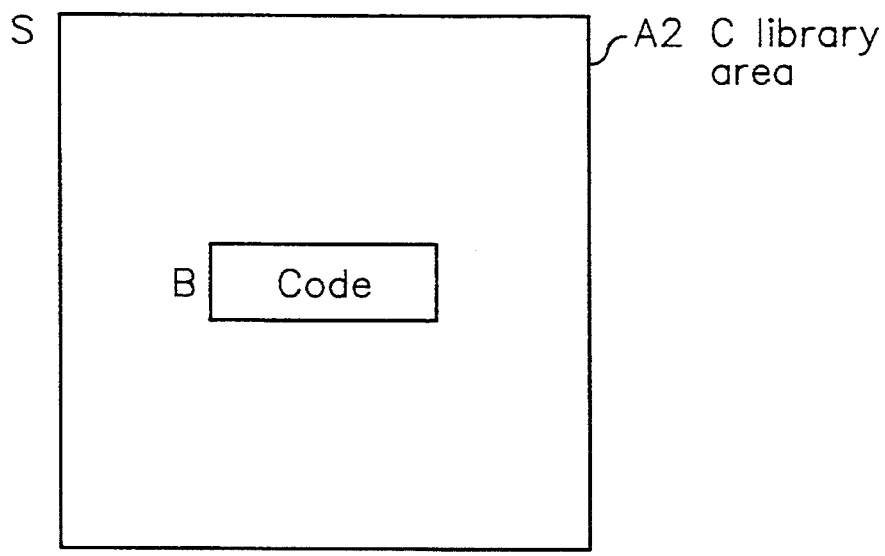

In FIG. 19, assume that the position dependent code is located at address B in C library area A2 of which the top address is S (where S is the relative address between the top address of the memory area and the top address of C library area A2, and B is the relative address between the top address of the memory area and the location address of the code in C library area A2). The value of the branch destination address is given by S+Y in accordance with Table T in FIG. 18. When the BASIC program is amended and when the top address in C library area A2 changes from S to S', the branch destination address is rewritten as S'+Y.

Thus, in the invention, the position dependent type code in the C library is not adversely affected even though the original BASIC program is changed. Also, advantageously, the execution program made by the compiler language can be loaded to the middle word area of the BASIC program.

Figure 20:
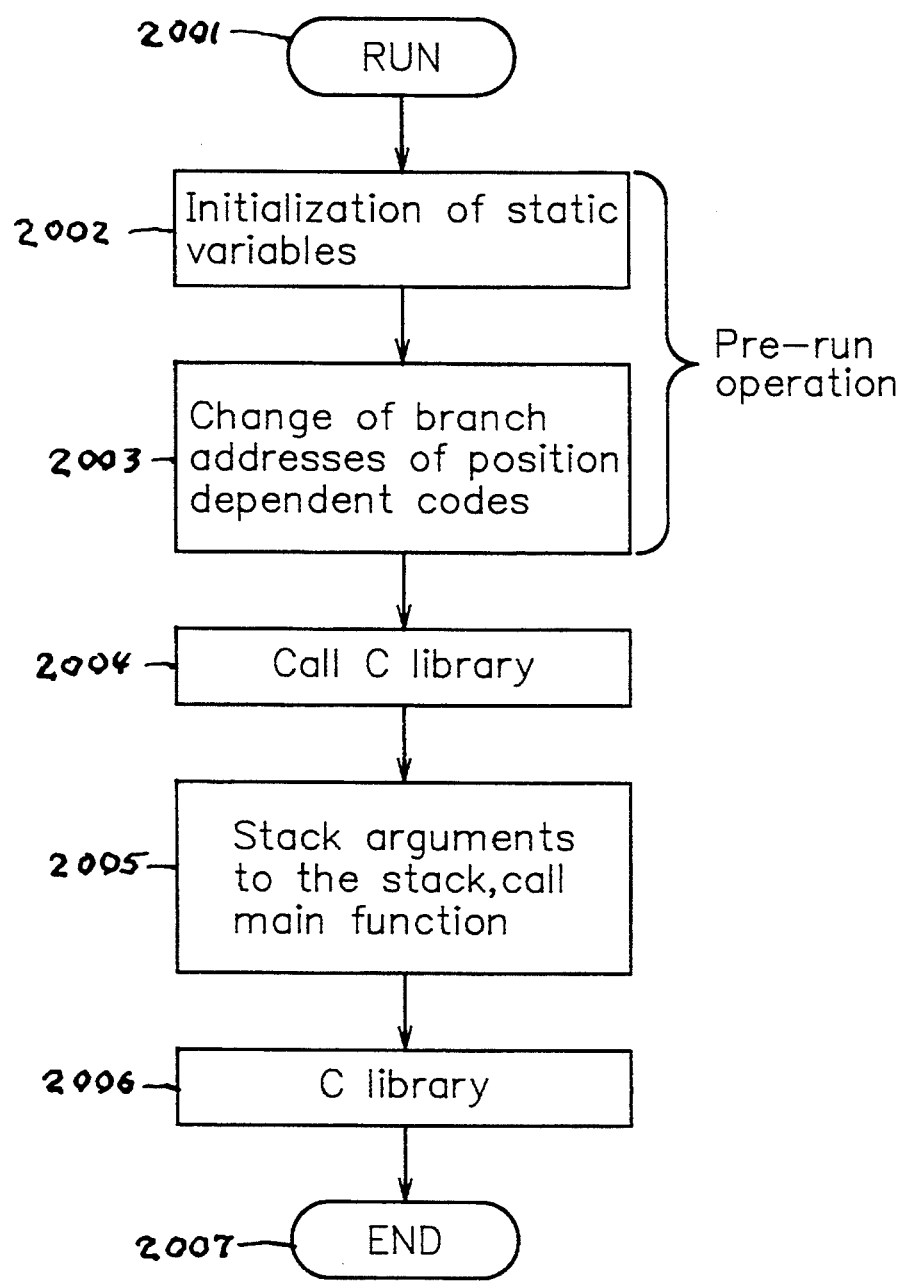
FIG. 20 is a flow chart depicting the function of the system by the invention when a compiler type language is loaded into the system.

FIG. 20 is a flow chart showing when the BASIC interpreter BSI calls the C library. When, the BASIC program starts (step 2001), in the C library, the initial value data in data area A25 is written into first static variable area A23, and "0" is written into second static variable area A24. By pre-run processing, all branch destination addresses of position dependent type codes in code area A22 are corrected in accordance with address converting table A26. The operation previously discussed is the pre-run processing for starting the BASIC program (steps 2002, 2003).

When the BASIC program is started, the C library is called (step 2004) as a subroutine. The common interface functions to start the program in adapter area A21. Adapter area A21 piles up arguments (step 2005) from the middle word area A1 of the BASIC program, and calls the main functions. Then, the C library is started (step 2006) and the compiled C language program is executed. The routine is ended at step 2007.

As previously discussed, advantageously, in the invention, the execution form program compiled by a C language can be loaded in the middle word area of the BASIC program. Furthermore, advantageously, the line computer .of the invention can use the compiler type language for the high speed processing demands, other than the usual interpreter type language.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. Method of executing a relocated compiled library program with an interpreter to control a manufacturing line which comprises memory means in which a user memory area is set for storing a middle word of an interpreter type language program, and processor means for executing, separately, said compiled library program stored in a library area of said user memory area and said middle word of said interpreter type language program; wherein said method comprises the steps of:

A) in said library area in which said complied library program is stored, creating:

a) an adapter area set at a top of said library area, said adapter area storing adapter programs for stacking arguments of said interpreter type language program and for calling main functions in said compiled library program, b) a data area set at a rear of said library area, said data area storing initial data of static variables to be used in execution of said main functions in said compiled library program, and c) an address converting table set at a bottom of said library area, said address converting table respectively storing each of a plurality of relative addresses (X) and (y) as a pair, wherein each said relative address (X) comprises an address relative from a top address of said compiled library program to one of a plurality of position dependent code addresses, and each said relative address (Y) comprises an address relative from said top address of said compiled library program to one of a plurality of branch destination addresses indicated by said one of said plurality dependent code addresses;

B) after loading said compiled library program in said library area, performing the following steps:

a) changing said interpreter type language program, said changing resulting in a shift position of said library area, and b) changing each of said plurality of relative addresses (X) and (Y) in said address converting table as a result of said changing;

C) when said interpreter starts and said interpreter type language program is executed, performing the following steps:

a) copying said initial data in said data area into the main functions in said complied library program, b) changing the plurality of branch destination addresses using said changed relative addresses (X) and (Y) in said address converting table, c) calling said compiled library program as a subroutine, d) executing said adapter programs to stack the arguments of said interpreter type language program and call the main functions in said compiled library program, and e) executing said main functions in said compiled library program using said stacked arguments.

* * * * *